United States Patent [19]
Laiho et al.

[11] Patent Number: 6,151,507
[45] Date of Patent: Nov. 21, 2000

[54] INDIVIDUAL SHORT MESSAGE SERVICE (SMS) OPTIONS

[75] Inventors: Tero Laiho, Vantaa; Timo Kinnunen, Paavola, both of Finland

[73] Assignee: Nokia Mobile Phones Ltd., Espoo, Finland

[21] Appl. No.: 08/965,749

[22] Filed: Nov. 7, 1997

[51] Int. Cl.$^7$ .................................................. H04Q 7/20
[52] U.S. Cl. ......................................... 455/466; 455/418
[58] Field of Search .................................... 455/466, 412, 455/414, 418, 552, 553, 556, 557; 370/349

[56] References Cited

U.S. PATENT DOCUMENTS

| | | | |
|---|---|---|---|
| 4,644,351 | 2/1987 | Zabarsky et al. | 340/825.44 |
| 5,878,397 | 3/1999 | Stille | 455/466 |

FOREIGN PATENT DOCUMENTS

| | | | |
|---|---|---|---|
| WO 98/12933 | 5/1995 | WIPO | H04Q 7/00 |

OTHER PUBLICATIONS

IS–136.1 Rev A, Post–Ballot Version, February 12, 1996, pp. 321–346, Ch. 7.

*Primary Examiner*—Lee Nguyen
*Attorney, Agent, or Firm*—Perman & Green, LLP

[57] ABSTRACT

A cellular radiotelephone (10) includes a keypad (22), a memory (24), and a display device (20) for displaying information to a user. The radiotelephone is bidirectionally coupled through a wireless interface to a network operating in accordance with a wireless communication protocol. A method comprises steps of (a) composing a text message in the radiotelephone for transmission to the network, (b) before transmitting the text message, entering information into the radiotelephone for specifying a state of at least one protocol element of the wireless communication protocol for placing the wireless communication protocol into a selected configuration, and (c) transmitting the previously composed text message from the radiotelephone to the network using the selected configuration. The user may also specify that a SMS message transmitted from the radiotelephone be converted to another message type (e.g., a facsimile message, a page message, or an electronic mail message) by the network, before being forwarded by the network. Another method of the invention includes the steps of (a) providing in the memory a plurality of sets of variables, each variable relating to a respective protocol element, (b) composing a text message in the radiotelephone for transmission to the network, (c) entering information into the radiotelephone for specifying a value for a selected variable of one of the sets of variables, (d) selecting one of the sets of variables for placing the wireless communication protocol into a selected configuration, and (e) transmitting the text message from the mobile terminal to the network using the selected configuration.

7 Claims, 18 Drawing Sheets

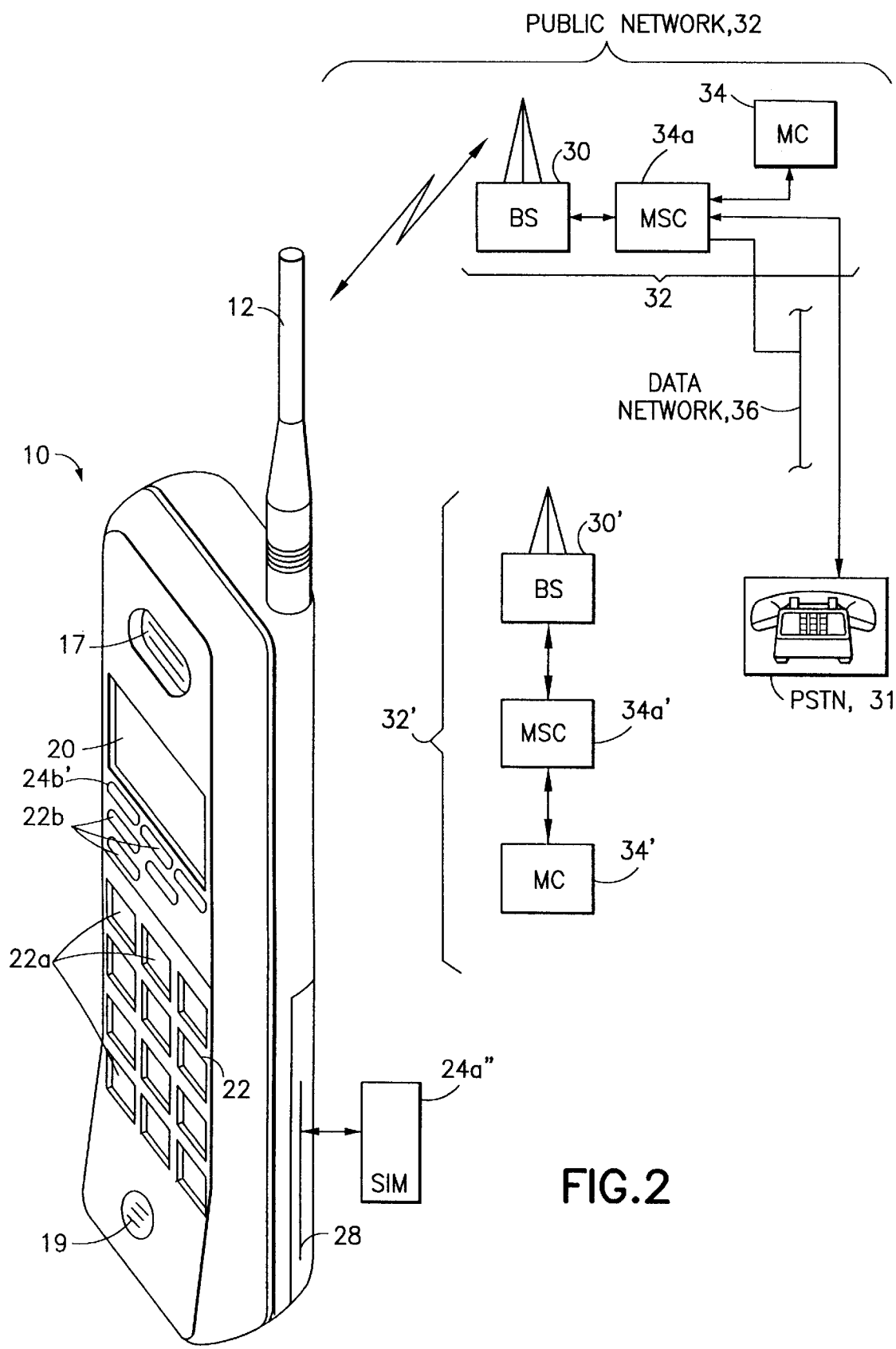

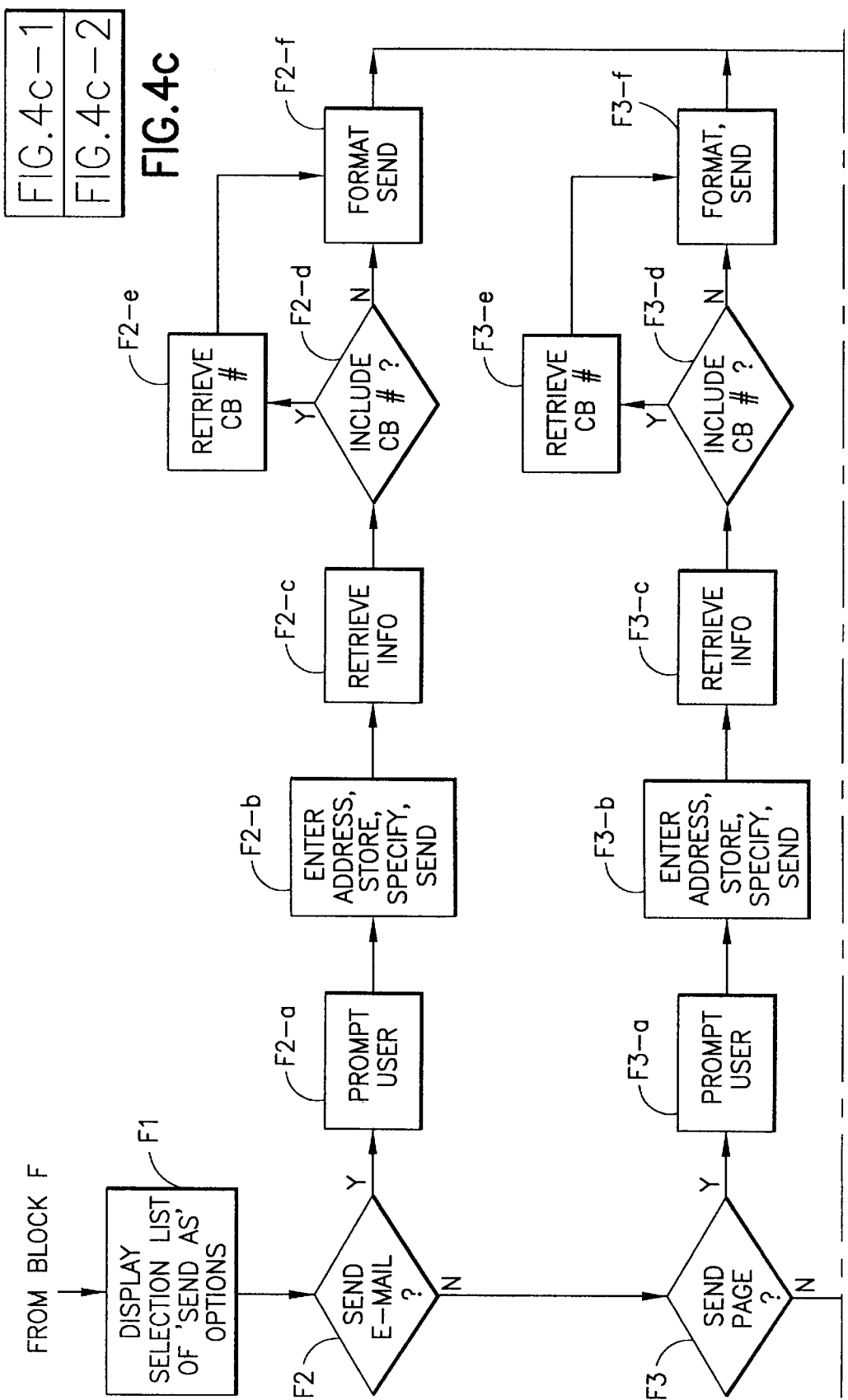

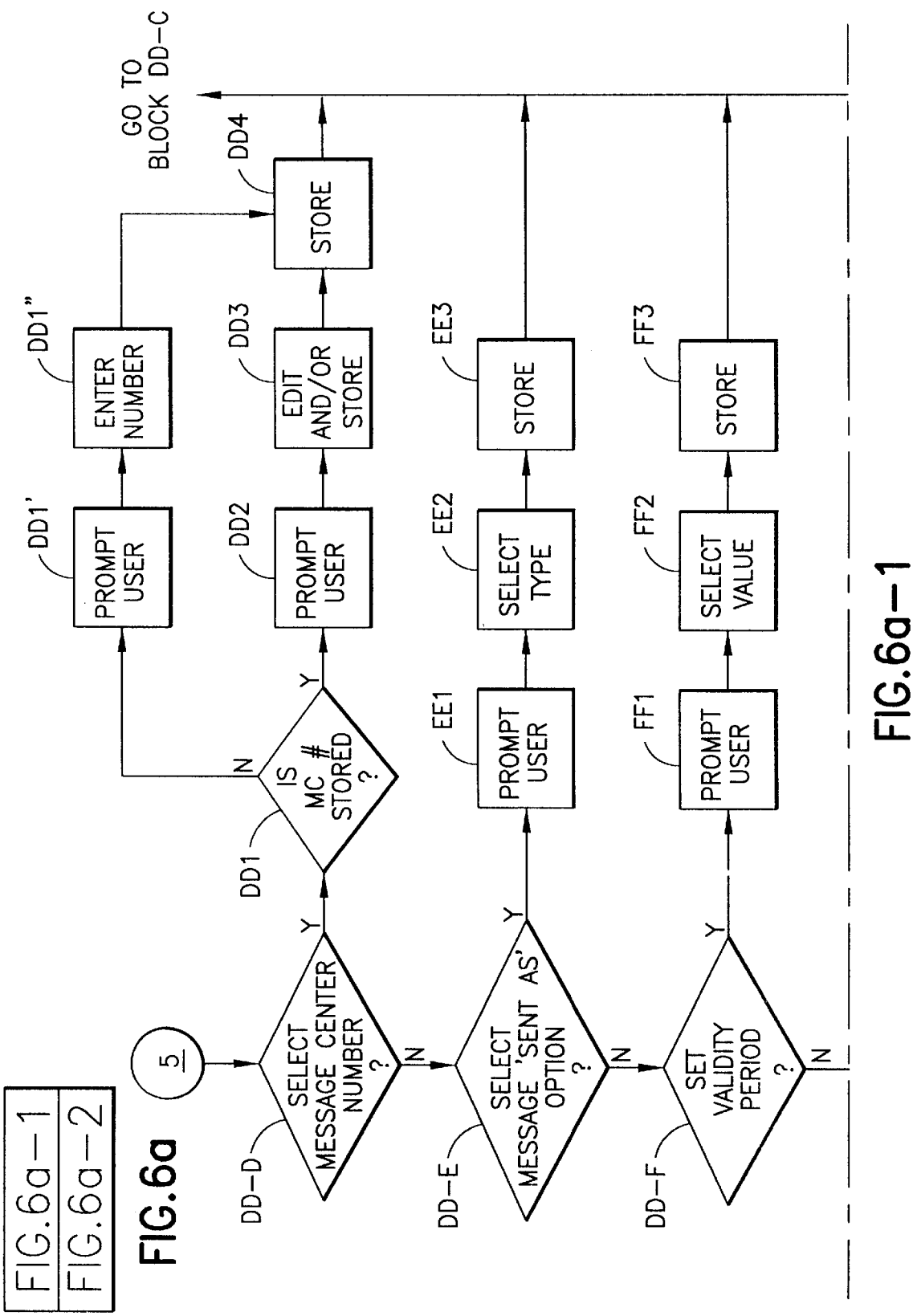

INDIVIDUAL SHORT MESSAGE SERVICE (SMS) OPTIONS

FIELD OF THE INVENTION

This invention relates to radiotelephones and, in particular, to mobile terminals such as those capable of operation with a cellular network.

BACKGROUND OF THE INVENTION

The so-called Short Message Service (SMS) is a point-to-point or point-to-multipoint service which enables a user to send messages to and receive text messages from other users of a communications network. The SMS attempts to deliver a message to a mobile terminal whenever th e terminal is registered to the network, even when the terminal is engaged in a voice of data call. The terminal may also roam throughout the network and still be capable of sending and receiving messages. A terminal configured for SMS provides methods for the user to receive, read, write/edit, clear, send, and save messages. The connection of a standard keyboard to the terminal facilitates the generation and editing of text messages by the user.

The network stores messages in at least one Message Center (MC), and Mobile Terminated (MT) messages are sent to the terminal by the MC. Various protocol layers receive the messages and check their contents. If the contents are valid, and assuming that there is room for incoming text messages in the memory of the terminal, the message is received and stored. Otherwise, the message is rejected.

U.S. Pat. No. 4,644,351 (Zabarsky et al.) discloses a paging system that enables messages to be sent to a remote unit, and which has a capability for the remote unit to transmit a message-received acknowledgement signal back to a central site. The paging system of Zabarsky et al. also enables a message-presented verification to be transmitted from an addressed pager back to the central site.

Reference can be had to various wireless communication protocols such as the TIA Interim Standards IS-136 and IS-137, and also to a document entitled "TDMA Forum, Implementation Guide: Short Message Terminals Compliant With IS-136 and IS-137" (Ed. D. Holmes, vers. 7.0, Apr. 20, 1995). These documents specify one type of SMS and the various system and terminal level protocols elements required to provide SMS. This latter document describes in sections 3.2.1 and 3.2.2 a Delivery Acknowledgement and a Manual Acknowledgement capability, respectively. By example, a message "Can you meet me this evening? <NTC>Yes<NTC>No", where NTC is a non-text character, is said would allow the user to select a response from "Yes" or "No", and consequently cause the terminal to send response codes 0 or 1.

Reference may also be had to protocol IS-136.1, Rev. A, Feb. 12, 1996, Section 7 (Point-to-Point Teleservices), for a description of SMS Deliver, SMS Delivery ACK, and SMS Manual ACK message formats and protocol elements. When the SMS Delivery ACK is specified, the mobile station automatically transmits the acknowledgement message upon delivery (i.e., display) of a stored SMS message to the user. When the SMS Manual ACK is specified, the mobile station transmits the acknowledgement message, and the user's response, after delivery and the user's input.

Various other types of protocol elements are also described in protocol IS-136.1, Rev. A, Feb. 12, 1996, Section 7. See, e.g., Section 7.1.3, which describes a Call Back Number protocol element, a Call Back Number Presentation Indicator protocol element, and an Urgency Indicator protocol element. The Call Back number protocol element enables a call back number associated with a SMS message to be identified. The Urgency Indicator protocol element is used to allow a sender of a SMS message to provide levels of urgency to the message.

Also described in IS-136.1, Rev. A, Feb. 12, 1996, Section 7.1.3 is a Delivery Acknowledgement Request protocol element and a Manual Acknowledgement Request protocol element. The Delivery Acknowledgement Request protocol element governs whether or not a recipient mobile terminal shall automatically return an acknowledgement message to an originating mobile terminal, after the recipient mobile terminal receives a SMS message from the originating mobile terminal and delivers (i.e., displays) the SMS message to a user of the recipient terminal. The Manual Acknowledgement Request protocol element governs whether or not the originating mobile terminal requests to be provided with an acknowledgement that the user of the recipient terminal inputs information into the recipient terminal in response to reading a displayed SMS message.

Conventional mobile terminals that operate in accordance with a wireless communication protocol (e.g., IS-136) generally have a capability that enables a user to specify states of various types of protocol elements of the wireless communication protocol, prior to the user composing a text message (and/or editting a retrieved text message) within the mobile terminal. By example, for the SMS Delivery ACK protocol element, the user may operate his mobile terminal so as to specify either "on" or "off", for indicating whether or not the mobile station shall automatically transmit an acknowledgement message upon delivery (i.e., display) of a stored SMS message to the user.

Unfortunately, however, conventional mobile terminals do not have a capability that enables the user to specify protocol element states while the mobile terminal is operating in a mode where the user is composing and/or editting a text message. As can be appreciated, this can cause problems for a user who, after composing and/or editting a text message in a mobile terminal, recognizes that one or more protocol element states should be modified before the text message is transmitted from the mobile terminal.

It can therefore be appreciated that it would be desirable to provide a radiotelephone that operates in accordance with a wireless communication protocol, and which has a capability for enabling a user to specify states of various types of protocol elements of the wireless communication protocol, after composing and/or editting a text message in the radiotelephone. This capability would enable user to place the applicable wireless communication protocol into a particular, selected configuration, and would also enable the text message to be subsequently transmitted from the radiotelephone as part of a SMS message, using the selected configuration of the wireless communication protocol.

It would also be desirable to provide a radiotelephone having a capability for enabling a user to modify information pertaining to multiple sets of protocol elements of the wireless communication protocol, and for enabling the user to select a particular one of these sets for placing the wireless communication protocol into a particular, selected configuration. This would also enable the text message to be transmitted from the radiotelephone using the selected configuration.

OBJECTS OF THE INVENTION

It is a first object of this invention to provide a radiotelephone that operates in accordance with a wireless communication protocol, and which has a capability for enabling a user to specify states of various types of protocol elements of the wireless communication protocol, after composing and/or editting a text message in the radiotelephone, and before transmitting the text message from the radiotelephone.

It is another object of this invention to provide a radiotelephone having a capability for enabling a user to modify information pertaining to multiple sets of protocol elements of the wireless communication protocol, and for enabling the user to select a particular one of these sets for placing the wireless communication protocol into a particular configuration that is used for transmitting a text message from the radiotelephone.

It is a further object of this invention to provide a radiotelephone for communicating SMS messages to a network, wherein the radiotelephone has a capability for enabling a user to specify that the network convert the SMS messages to other, selected message types before the network forwards the message to a destination.

Further objects and advantages of this invention will become apparent from a consideration of the drawings and ensuing description.

SUMMARY OF THE INVENTION

The foregoing and other problems are overcome and the objects of the invention are realized by methods and apparatus in accordance with embodiments of this invention. A method of this invention is disclosed for operating a mobile terminal, such as cellular radiotelephone, of a type that is bidirectionally coupled through a wireless interface to a network operating in accordance with a wireless communication protocol (e.g., IS-136 ). The mobile terminal includes a keypad having a plurality of keys, a memory wherein is stored information pertaining to a plurality of protocol elements of the wireless communication protocol, and a display device for displaying information, including messages, to a user.

In accordance with one aspect of this invention, a method for operating the mobile terminal includes the steps of (a) composing a text message in the radiotelephone for transmission to the network, (b) before transmitting the composed text message, entering information into the radiotelephone for specifying a state of at least one protocol element of the wireless communication protocol for placing the wireless communication protocol into a selected configuration, and (c) transmitting the previously composed text message from the radiotelephone to the network using the selected configuration of the wireless communication protocol. In accordance with this aspect of the invention, the user may specify states (i.e., "on/off", "yes/no", and/or whether a value is to be included in a particular variable) for any of the plurality of protocol elements of the wireless communication protocol. By example, the user may specify a state for a call back number protocol element to indicate that a predefined call back number of the mobile terminal shall be included in the previously-composed text message. Also by example, the user may specify a state for a manual acknowledgement request protocol element and/or a delivery acknowledgement request protocol element to indicate that one or more of these acknowledgement request types be included in the previously-composed text message. Further by example, the user may specify a state for an urgency protocol element so as to assign a selected one of the plurality of predefined priority status levels (e.g., a 'normal' priority status level or an 'urgent' priority status level) to the previously-composed text message.

In accordance with one embodiment of the invention, the text message composed by the user may include a Short Message Service (SMS) message. Also, and in accordance with another aspect of this invention, the user may operate the mobile terminal so as to specify that after the text message is communicated to the network, the network should convert the text message to a selected one of a plurality of message types before forwarding the text message to a destination. By example, the user may specify that the network convert the SMS message to a facsimile message, an electronic mail (E-mail) message, or a page message. In accordance with this aspect of the invention, a method comprises a step (a) of entering information into the mobile terminal for specifying that the text message be converted by the network to a selected one of the plurality of message types. In response to the information entered into the mobile terminal at step (a), the mobile terminal performs steps of (b) prompting the user for specifying a selected access code for the destination, (c) monitoring an output of the keypad to detect information specifying the selected access code for the destination, and (d) in response to detecting this information, transmitting the text message to the network. The transmitted text message includes the information entered into the mobile terminal at step (a) and the information specifying the selected access code for the destination. After receiving the text message from the mobile terminal, the network then converts the text message to the message type specified by the user, and forwards the message to the destination identified by the user-specified access code.

In accordance with another aspect of this invention, the memory of the mobile terminal includes a sub-memory portion wherein are stored a plurality of sets of variables. Each of the variables pertains to a respective protocol element. By example, the variables of each set relate to a message center number protocol element, a validity period protocol element, a destination access code protocol element, an identifier tag protocol element, and a message conversion type protocol element, respectively. The sub-memory portion in accordance with this aspect of the invention may be an integral component of the mobile terminal or may be embodied as a removable memory card.

In accordance with this aspect of the invention, the user may assign values to one or more variables of a selected one of the sets of variables. According to this aspect of the invention, a method is provided that includes the steps of (a) composing a text message in the mobile terminal for transmission to the network, (b) entering information into the mobile terminal for specifying a value for a selected at least one of the variables of a selected one of the sets of variables, (c) selecting one of the sets of variables for placing the wireless communication protocol into a selected configuration, wherein the selected configuration is based on the values of the variables of the selected set of variables, and (d) transmitting the previously composed text message from the mobile terminal to the network using the selected configuration of the wireless communication protocol. It should be noted that the user may assign values to variables of selected ones of the sets of variables after completely or partially composing the text message and/or after completely or partially editting a text message retrieved from memory.

Also in accordance with this aspect of this invention, other, "common" variables are stored in another sub-memory portion of the memory. In a preferred embodiment of the invention, there are two "common" variables defining states of a delivery report protocol element and a reply path protocol element, respectively. The states defined by these variables may be modified in a similar manner as was described above to place the wireless communication protocol into a selected configuration that may be used for transmission of the text message to the network. It should be noted that, as for the sets of variables described above, the user may modify the states of the "common" variables after completely or partially composing a text message, and/or after completely or partially editting a text message retrieved from memory.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1A:
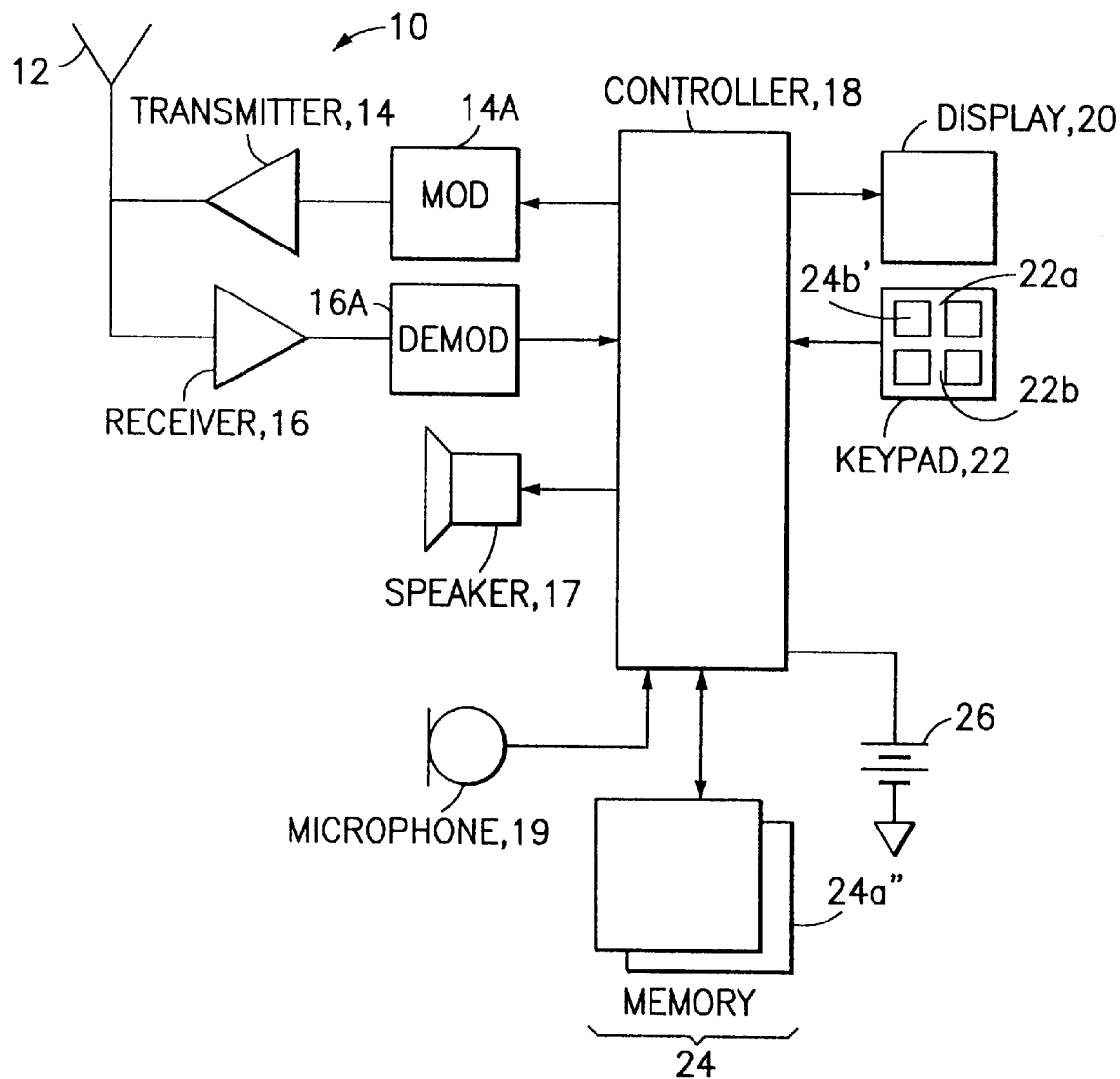
FIG. 1a is a block diagram of a mobile terminal that is constructed and operated in accordance with this invention.
Figure 4A:
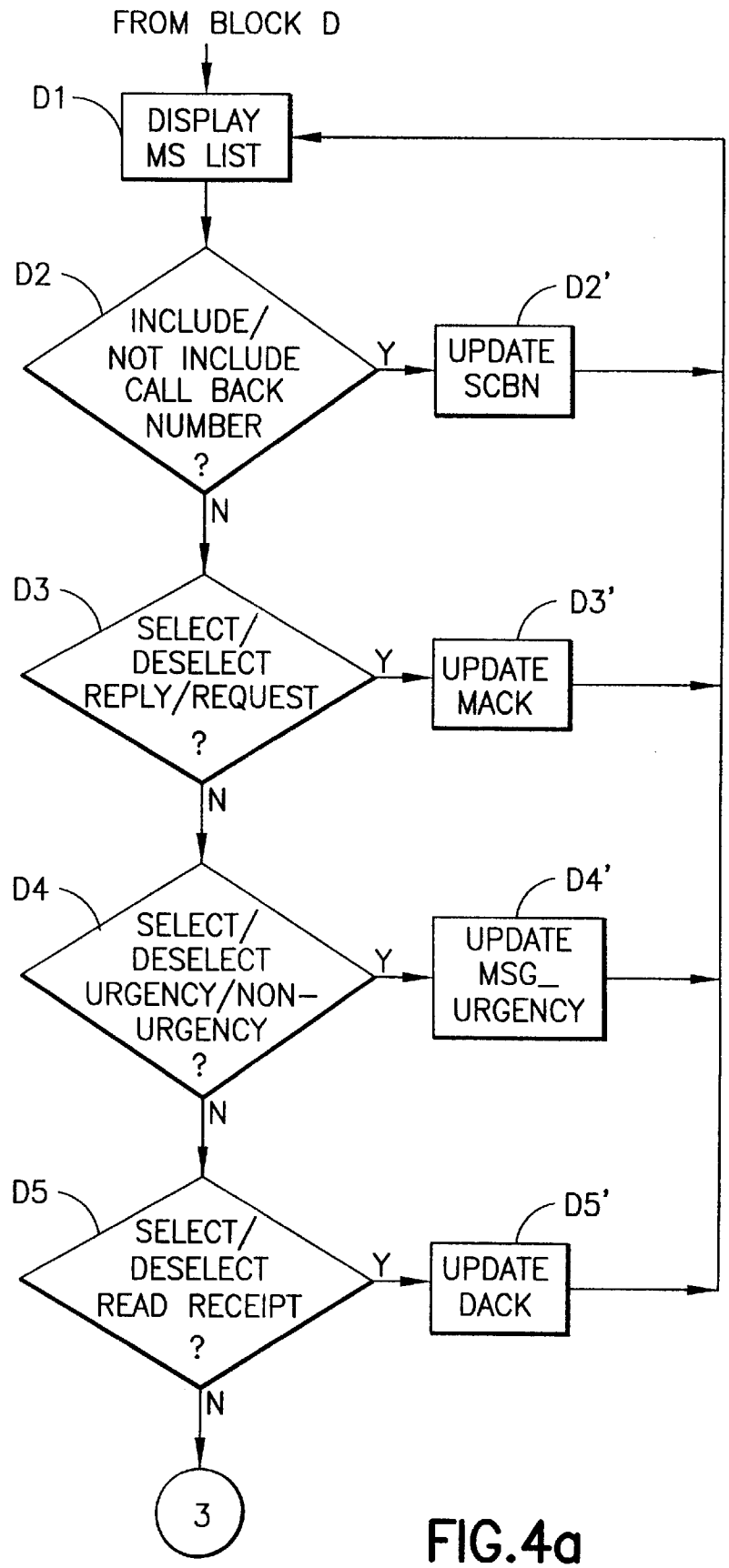
FIGS. 4a and 4b show in greater detail a portion of the logic flow diagram of FIG. 3a identified by block D'.
Figure 4B:
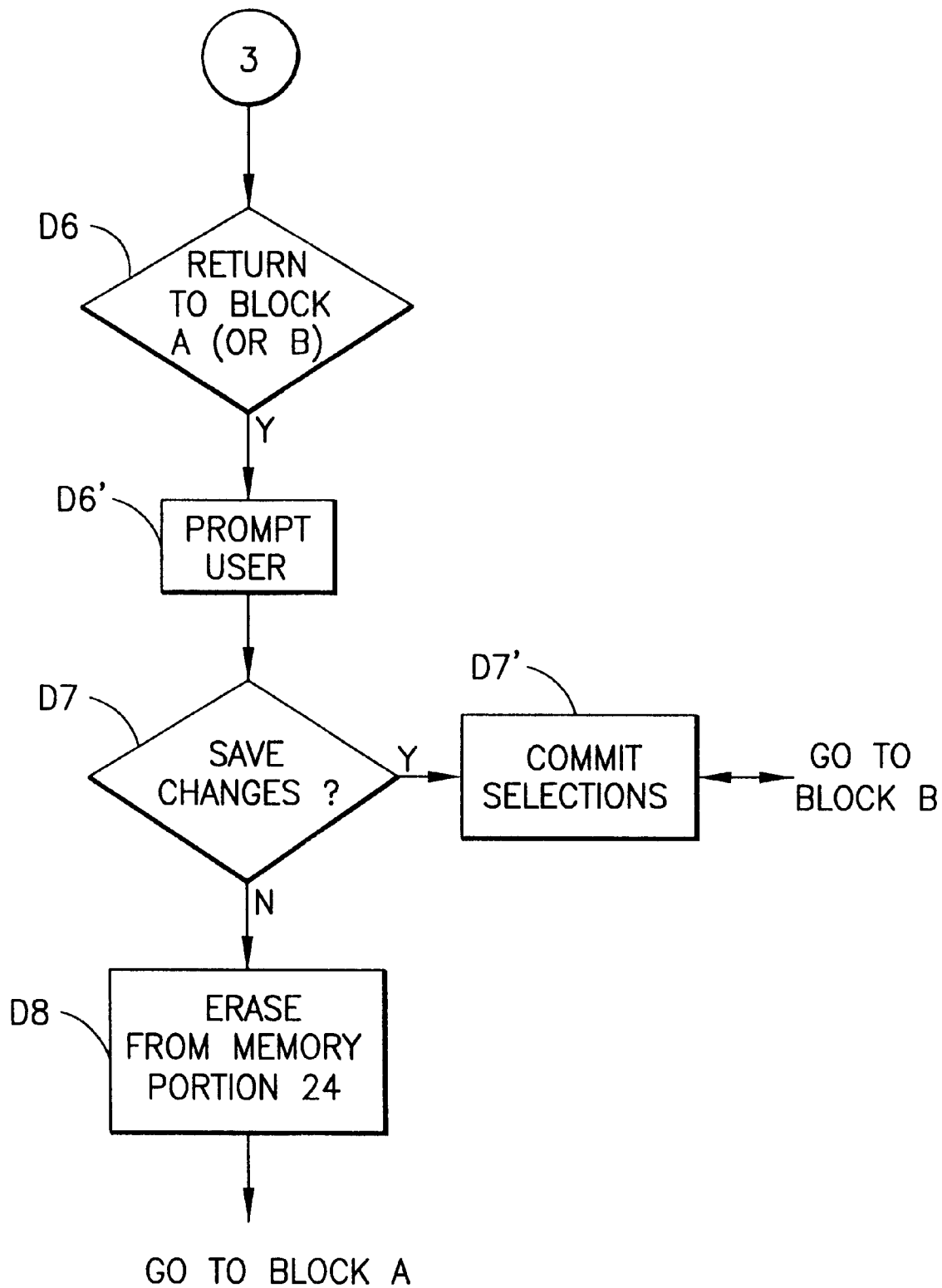
Figures 2, 4C:
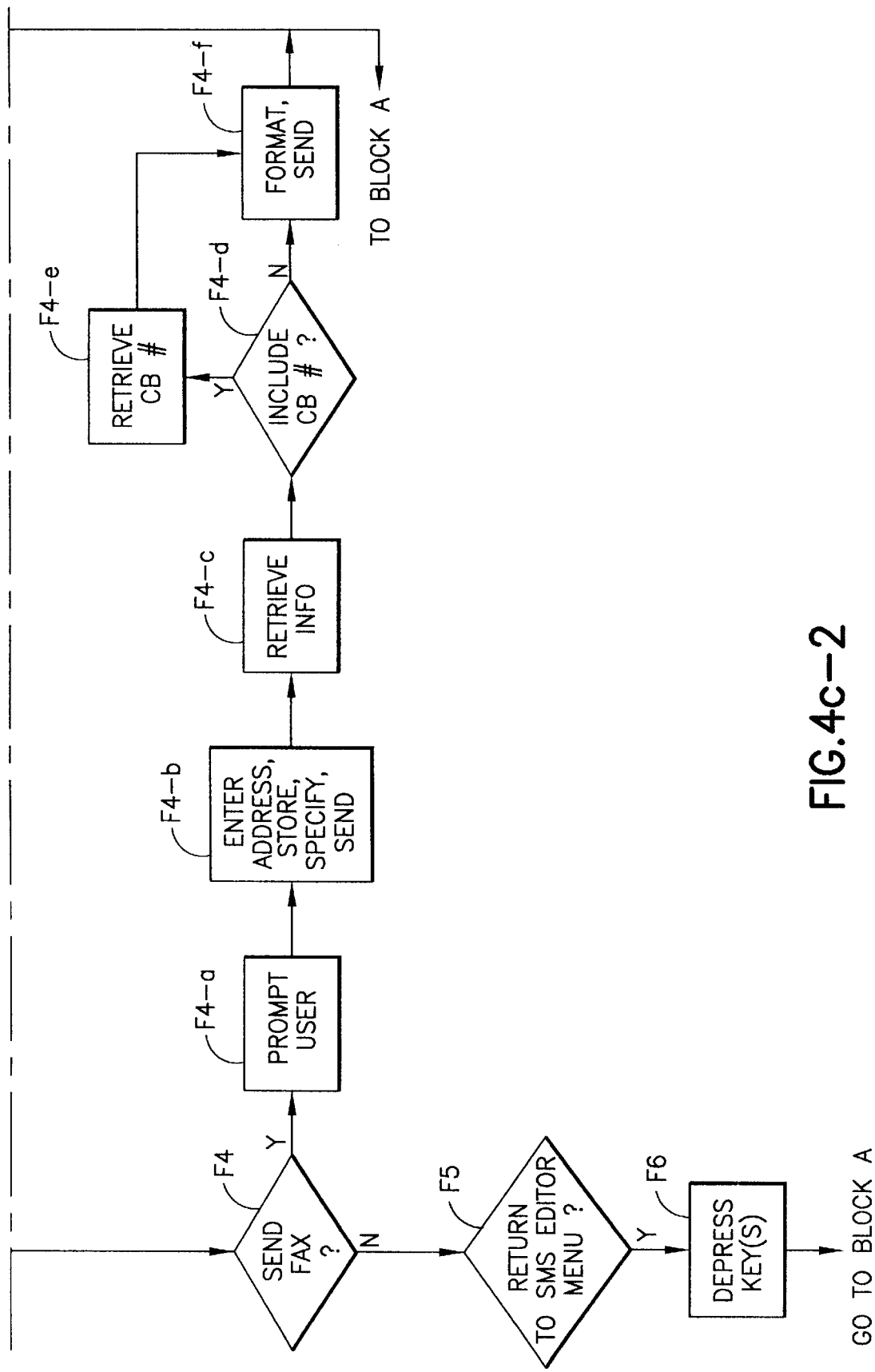
FIG. 2 is an elevational view of the mobile terminal shown in FIG. 1a, and further illustrates a cellular communication system to which the mobile terminal is bidirectionally coupled through wireless RF links.
FIG. 4c shows in greater detail a portion of the logic flow diagram of FIG. 3a identified by block F'.
Figure 4E:
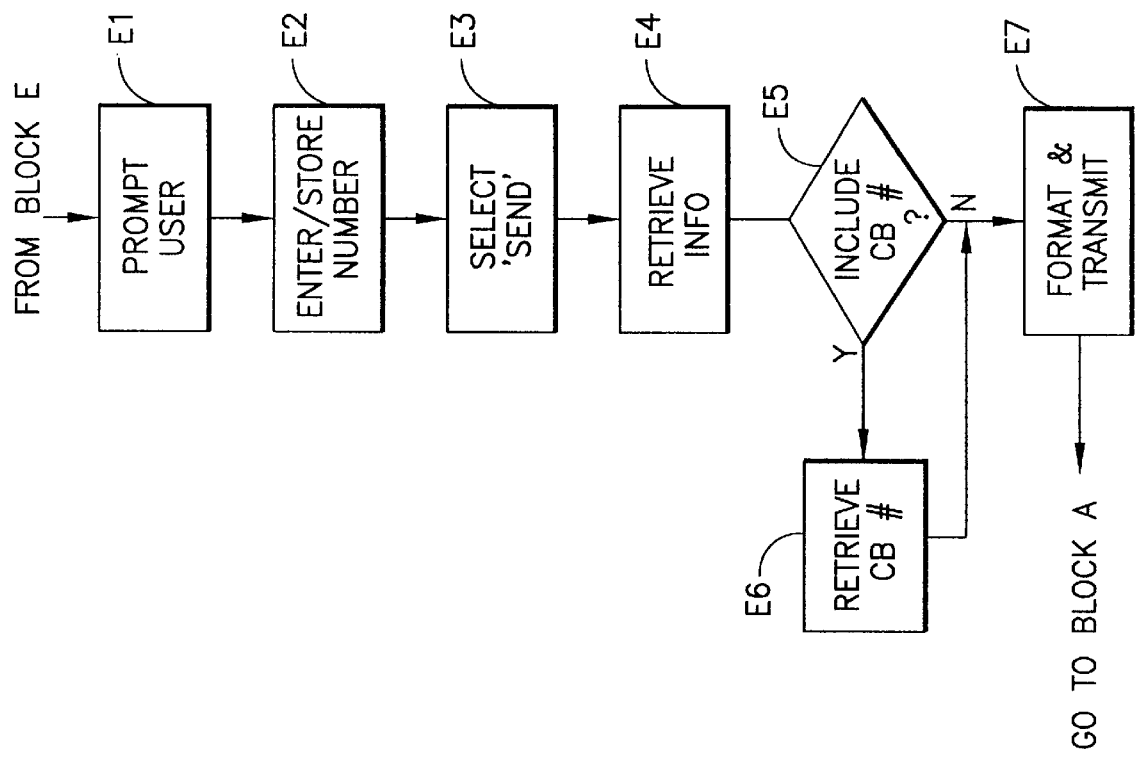
FIG. 4e shows in greater detail a portion of the logic flow diagram of FIG. 3a identified by block E'.
Figure 4D:
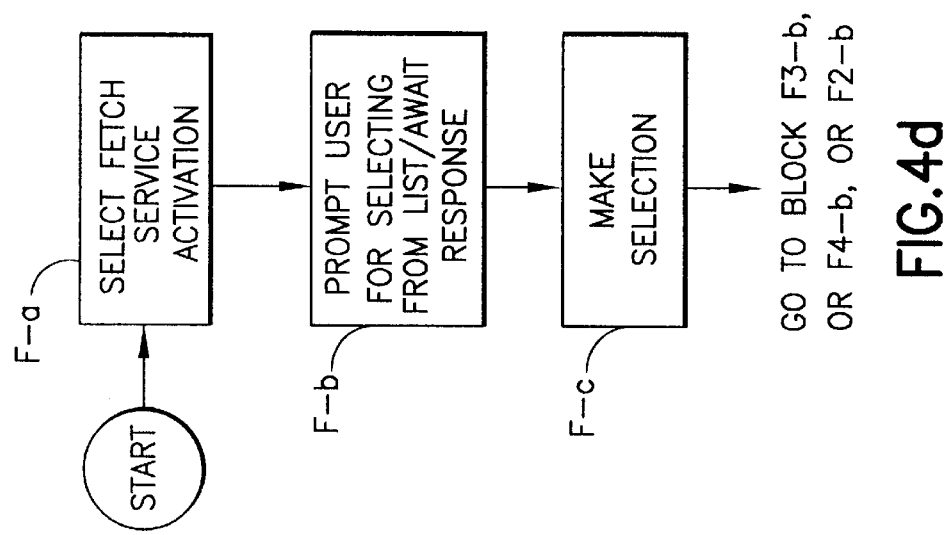
FIG. 4d shows a logic flow diagram of a method executed by the mobile terminal of FIGS. 1a and 2, in accordance with a "fetch service" operation.

Reference is made to FIGS. 1a and 2 for illustrating a mobile terminal 10, in particular a cellular radiotelephone, that is suitable for practicing this invention. The mobile terminal 10 includes an antenna 12 for transmitting signals to and for receiving signals from a base site or base station 30. The base station 30 is a part of a first cellular network 32 that includes a message switching center (MSC) 34a and a message center (MC) 34. The MSC 34a controls the forwarding of messages to and from the mobile terminal 10 when the terminal is registered with the network, and also controls the forwarding of messages for the mobile terminal 10 to and from MC 34. These messages may include, by example, voice messages received by the MSC 34a from users of Public Switched Telephone Network (PSTN) telephones 31, and may also include Short Message Service (SMS) messages and voice messages received by the MSC 34a from the mobile terminal 10 or other mobile terminals (not shown) serviced by the network 32. The MSC 34a further provides a connection to landline trunks when the mobile terminal 10 is involved in a call. FIG. 2 also shows a second network 32' having associated base station(s) 30', a MSC 34a', and a MC 34'.

It is assumed for the purposes of this invention that the MC 34 has a capability for converting SMS messages originating from the mobile terminal 10 to electronic mail (E-mail) messages, page messages, or facsimile messages, for cases in which the SMS messages include a command specifying that the messages be converted to these respective message types. It is also assumed for the purposes of this invention that the network 32 supports data services and is coupled to a data network 36 such as the internet and/or to a LAN or WAN. Furthermore, it is assumed that the MSC 34a forwards data, including facsimile and electronic mail (E-mail) messages, to destination devices such as, e.g., destination CPUs and facsimile devices (not shown), via data network 36.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include SMS capability, one suitable type of Teleservices capability is defined in Section 7 of IS-136.1, Rev. A, as modified by the teaching of this invention.

A user interface includes a conventional speaker 17, a conventional microphone 19, a display 20, and a user input device, typically a keypad 22, all of which are coupled to the controller 18. The keypad 22 includes the conventional numeric (0–9) and related keys (#, *) 22a, and also other keys 22b used for operating the mobile terminal 10. These other keys 22b include, by example, a SEND key, various menu scrolling and soft keys, and a PWR key. The mobile terminal 10 also includes a battery for powering the various circuits that are required to operate the terminal.

It should be understood that the mobile terminal 10 can be a vehicle mounted or a handheld device. It should be further appreciated that the mobile terminal 10 can be capable of operating with one or more air interface standards, communication protocols, modulation types, and access types. By example, the mobile terminal may be capable of operating in accordance with wireless communication protocols IS-136, GSM, and IS-95 (CDMA). Some narrow-band AMPS (NAMPS), as well as TACS, mobile terminals may also benefit from the teaching of this invention, as should dual or higher mode phones (e.g., digital/analog or TDMA/CDMA/ analog phones). In general, the teaching of this invention applies to any radiotelephone, pager user terminal, or personal communicator, that is capable of receiving a message from a system, and that includes a display for displaying the message to a user. Also, the teaching of this invention applies to any radiotelephone, pager user terminal, or personal communicator, that includes a user input device, such as a keypad, with which the user can manually generate messages and also interact with a displayed menu to select various mobile terminal functions and to input data. It should thus be clear that the teaching of this invention is not to be construed to be limited to any one particular type of mobile terminal, air interface standard, or communication protocol.

The mobile terminal 10 also includes various memories, shown collectively as the memory 24, wherein are stored a plurality of constants and variables that are used by the controller 18 during the operation of the mobile terminal. For example, the memory 24 stores information relating to various cellular system protocol elements and the number assignment module (NAM). An operating program for controlling the operation of controller 18 is also stored in the memory 24 (typically in a ROM device). The memory 24 also stores data, including user messages, that are received from the cellular network 32 prior to the display of the messages to the user.

In accordance with one embodiment of the invention, which will be described below, at least a portion of the memory can include a memory card or cartridge 24a″ (e.g., a SIM card), which may be inserted into a slot 28 of the mobile terminal 10 for being coupled to controller 18, and which may be removed from the slot 28 by the user.

Figure 1C:
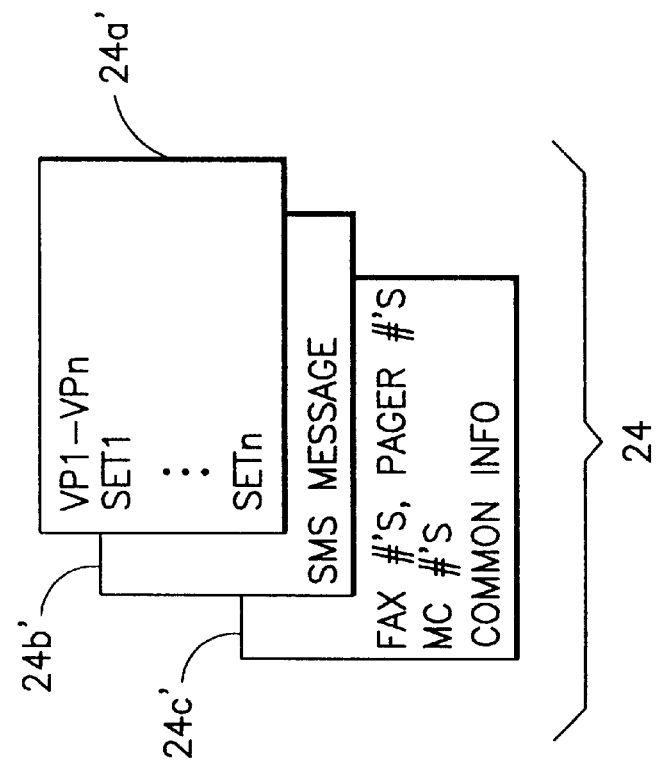
FIG. 1c shows the memory 24 of the mobile terminal of FIG. 1a in accordance with another embodiment of the invention.
Figure 1B:
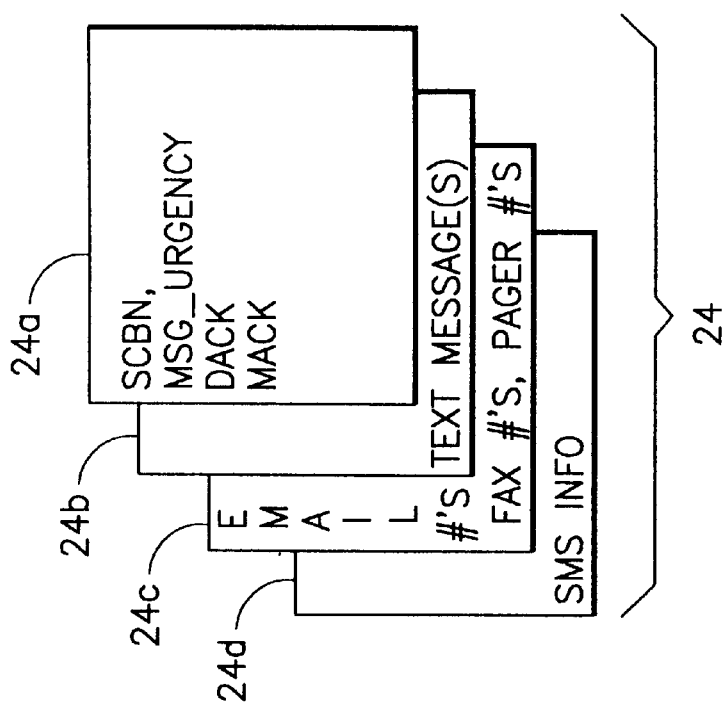
FIG. 1b shows a memory 24 of the mobile terminal of FIG. 1a in accordance with one embodiment of the invention.

In accordance with one embodiment of the invention, and referring to FIG. 1b, the memory includes various memory portions that are labelled "24a", "24b", "24c", and "24d". Memory portion 24a, which preferably includes a non-'volatile memory, stores various types of information that relates to various protocol elements. The information relating to these protocol elements is stored temporarily in memory portion 24a, before being "committed" to memory portion 24d (by the user) and eventually included in SMS messages transmitted from the mobile terminal 10, as will be described below. Preferably, the protocol elements to which the information relates include a call back number protocol element such as that defined in, by example, section 7.1.3 (Call Back Number Presentation Indicator) of IS-136.1, Revision A, or later revisions thereof, a delivery acknowledgement request protocol element such as that defined in, by example, section 7.1.3 (Delivery Acknowledgement Request) of IS-136.1, Revision A, or later revisions thereof, a manual acknowledgement request protocol element such as that defined in, by example, section 7.1.3 (Manual Acknowledgement Request) of IS-136.1, Revision A, or later revisions thereof, and a validity protocol element such as that defined in, by example, section 7.1.3 (Urgency Indicator) of IS-136.1, Revision A, or later revisions thereof.

Examples of the various types of information stored in memory portion 24a will now be described. Memory portion 24a stores information defining a state (e.g., a "1" or "0", "yes" or "no", or whether or not a value is to be included in a variable) of a call back number protocol element. More particularly, this information specifies whether or not a predefined access code (also referred to as a "call back number (CB#)") for the mobile terminal 10 is to be included in a SMS message that is transmitted from the mobile terminal 10. This information is stored as a variable "SCBN" and may have a format in accordance with that of, by example, section 7.1.3 (Call Back Number Presentation Indicator) of IS-136.1, Revision A, or later revisions thereof.

The memory portion 24a also stores a variable "DACK". The variable DACK stores information defining a state of a delivery acknowledgement request protocol element. More particularly, this information specifies whether or not a delivery acknowledgement request is to be included in a SMS message that is transmitted from the mobile terminal 10. Memory portion 24a also stores a variable "MACK" that includes information defining a state of a manual acknowledgement request protocol element. This information specifies whether or not a manual acknowledgement request is to be included in a SMS message transmitted from the terminal 10.

The information stored as the DACK and MACK variables is preferably defaulted to indicate that no acknowledgement is requested. This information may be modified by a user of a mobile terminal 10 so as to change the state of the respective protocol element, as will be described below. Typically, the user will specify that a delivery acknowledgement request be included in a SMS message transmitted from the terminal 10 when he desires to be provided with an acknowledgement that th e message was received by a receiving terminal and displayed to a user of the receiving terminal. The user will also typically specify that a manual acknowledgement request be included in a SMS message transmitted from the mobile terminal 10 when he desires to be provided with an acknowledgement that a user of a recipient terminal inputs information into the recipient terminal in response to reading a displayed version of the SMS message. The information stored as the variable DACK may have a format in accordance with that of, by example, section 7.1.3 (Delivery Acknowledgement Request) of IS-136.1, Revision A, or later revisions thereof, and the information stored as the variable MACK may have a format in accordance with that of, by example, section 7.1.3 (Manual Acknowledgement Request) of IS-136.1, Revision A, or later revisions thereof.

The memory portion 24a further stores information defining a state of an urgency protocol element. In particular, this information indicates whether a SMS message transmitted from mobile terminal 10 is assigned a 'normal' or 'urgent' priority status. This information is stored as a variable "msg_urgncy", and may have a format in accordance with that of, by example, section 7.1.3 (Urgency Indicator) of IS-136.1, Revision A, or later revisions thereof.

Also in accordance with this embodiment of the invention, the memory portion 24b is preferably a non-volatile memory and function s as a buffer for storing SMS message information. This information includes, by example, user-generated text messages, and user-specified access information, such as an E-mail address, a pager number, or a facsimile number, for a destination device to which a SMS message is to be sent.

Memory portion 24c stores a plurality of predefined pager numbers, facsimile numbers, and electronic mail (E-mail) addresses (i.e., forming a "directory" of pager numbers, facsimile numbers, and E-mail addresses) that may be accessed and retrieved by the user while the mobile terminal 10 is operating accordance with a "fetch" service. The manner in which the "fetch" service operates will be described below.

Memory portion 24d stores similar variables (i.e., SCBN, msg_urgncy, DACK, and MACK) as the memory portion 24a. As will be described below, information stored as the variables SCBN, msg_urgncy, DACK, and MACK, in memory portion 24a may be loaded (i.e., "committed to memory") into memory portion 24d, for cases in which the user desires to save protocol element state modifications made under a 'settings' option (to be described below). Memory portion 24d also stores information specifying a predefined dialing access code (e.g., telephone number) for the mobile terminal 10. The dialing access code is hereinafter also referred to as a "call back number (CB#)", and the information specifying the dialing access code may have a format in accordance with that of, by example, section 7.1.3 (Call Back Number) of IS-136.1, Revision A, or later revisions thereof. Preferably, the dialing access code is stored in the NAM, and is predefined, although it may be accessed and editted by the user by operation of the keypad 22. Memory portion 24d further stores messages including, by example, SMS messages that are received by the mobile terminal 10 from the network 32. The information stored in memory portion 24d is collectively represented in FIG. 1a by the term "SMS info".

The operating program in the memory 24 includes routines to present messages and message-related functions to the user on the display 20, typically as various menu items. The memory 24 also includes routines for implementing the methods described below in relation to FIGS. 3a, 3b, 4a–4e, 5a, 5b, and 6a–6c.

Figure 3A:
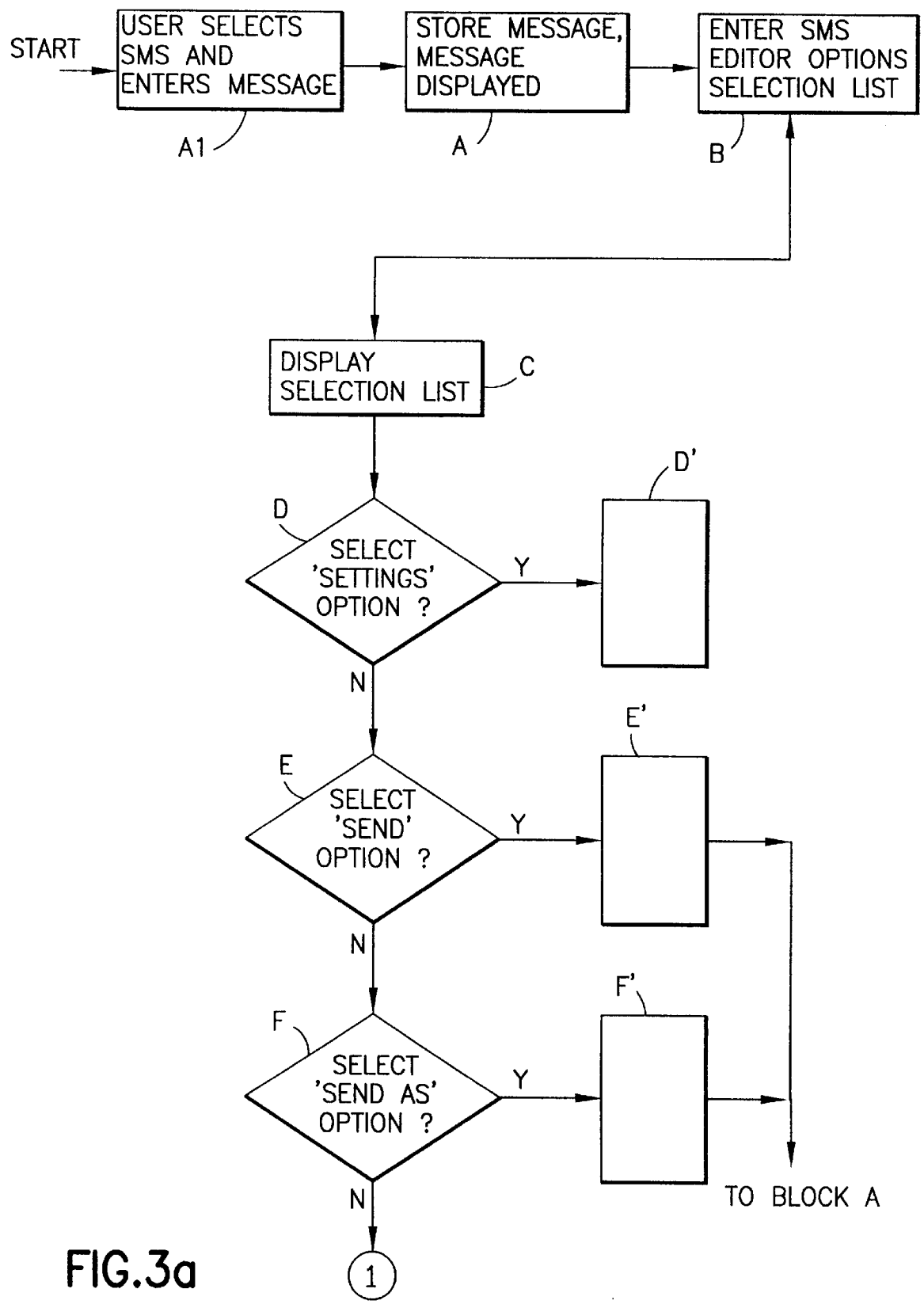
FIGS. 3a and 3b are a logic flow diagram that illustrates a method executed by the mobile terminal shown in FIGS. 1a and 2, in accordance with one embodiment of the invention.
Figure 3B:
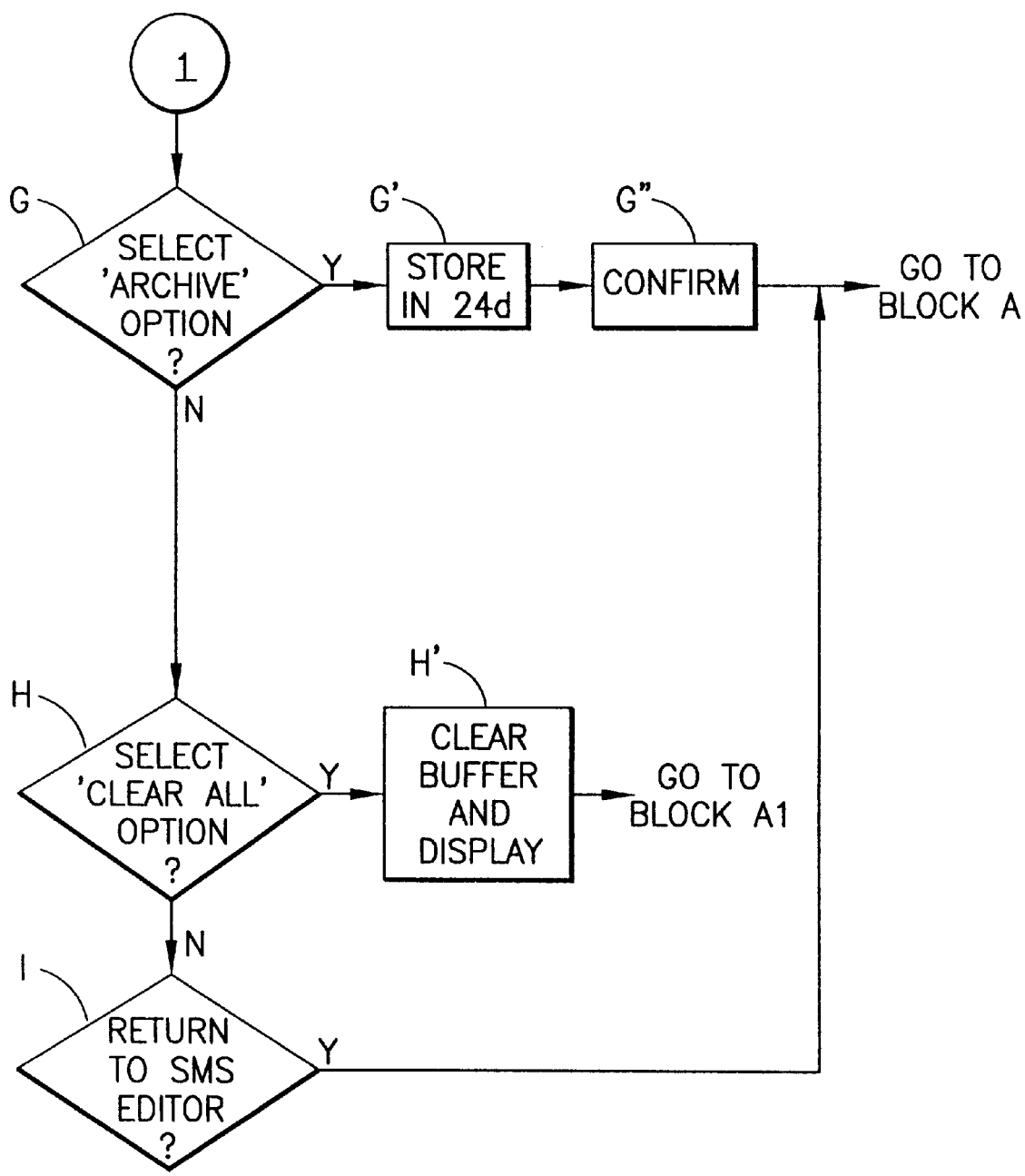

Reference is now made to FIGS. 3a and 3b, for illustrating a first method in accordance with this invention. The method will be described in the context of one existing wireless communication protocol (i.e., an interim cellular digital standard) (IS-136) that provides a Short Message Service (SMS) capability, although the teaching of this invention is not limited for use only with this particular interim standard.

Referring to FIG. 3a, at block A1 it is assumed that a user of the mobile terminal 10 operates keypad 22 so as to cause the mobile terminal 10 to enter a SMS origination mode and a corresponding SMS origination/editor menu function. In the SMS origination/editor menu function, the mobile terminal 10 prompts the user via the display 20, to enter a message (e.g., an alphanumeric text message) into the mobile terminal 10, and also prompts the user for selecting, if desired, a SMS editor options selection list menu function. By example, the mobile terminal 10 may prompt the user to enter a message into the mobile terminal 10 by presenting a blinking cursor on the display 20, and may simultaneously prompt the user to select the SMS editor options selection list menu function by presenting the word "option" on a portion of the display 20.

Figure 7A:
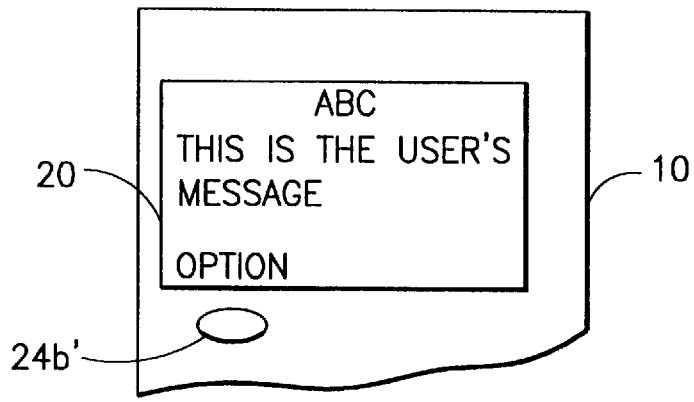
FIGS. 7a–7d show various messages presented on a display 20 of the mobile terminal of FIGS. 1a and 2, during portions of the method of FIGS. 3a and 3b.

Assuming that the user operates the keypad 22 so as to enter a message into the mobile terminal 10, the mobile terminal 10 responds by storing the message in the memory portion 24b for subsequent transmission as part of a SMS message, and further responds by presenting the message on display 20 of the mobile terminal 10 (block A). An example of a user-generated message presented on the display 20, as well as a message (e.g., the word "option") prompting the user to select the SMS editor options selection list menu function, is shown in FIG. 7a. It should be noted that in some embodiments of this invention the mobile terminal 10 can be connected to an external data processor through a suitable data connection, and the user is thereby enabled to enter his message from the external data processor.

It should be noted that the stored message need not be entered by the user, but could instead, by example, have been previously received from the air interface and stored in memory portion 24d, in which case the message is being forwarded to another user. By example, in response to being prompted by the mobile terminal 10 at block A1, the user may respond by operating the keypad 22 so as to request that the previously received message be retrieved from memory portion 24d. In this case, the mobile terminal 10 responds to the user's request by retrieving the message from memory portion 24d, by presenting the retrieved message on the display 20, and by loading the message into memory portion 24b. The user may then edit the message, if desired, by operation of the keypad 22.

The mobile terminal 10 has a capability that enables the user to specify states of various protocol elements while the mobile terminal 10 is operating in the SMS origination mode, and before the user-generated message is transmitted from the mobile terminal 10 as part of a SMS message. In this manner, the communication protocol (which the mobile terminal 10 is operating in accordance with and which includes the various protocol elements) can be placed into a particular, selected configuration, that can be used for transmission of the SMS message from the mobile terminal 10. In accordance with this invention, the user may specify states of these protocol elements after having created any portion of a message (e.g., a text message) at block A, or after retrieving (and, if desired, editting) a previously received message from memory portion 24d at block A. More particularly, in accordance with this invention the mobile terminal 10 can be operated by the user so as to modify information relating to selected ones of various protocol elements (so as to specify states for these protocol elements) after any portion of the text message has been entered into mobile terminal 10 and stored in memory portion 24b (i.e., after the user has composed any portion of a message) (or after a previously received message has been retrieved from memory portion 24d). The protocol element information modifications place the communication protocol for the mobile terminal 10 into a configuration that is based at least in part on these modifications. The procedure for making the information modifications may be initiated while the mobile terminal 10 is operating in the SMS origination mode, and prior to any transmission of the SMS message from the mobile terminal 10. After the information modifications are made, and upon the user operating the terminal 10 so as to specify that a SMS message be transmitted from the mobile terminal 10, the transmitted SMS message will include the modified protocol element information, as will be further described below.

Also in accordance with this invention, the mobile terminal 10 has a capability for enabling the user to specify an eventual message type for a SMS message transmitted from the terminal. More particularly, the mobile terminal 10 has a capability for enabling the user to specify that a SMS message transmitted from the mobile terminal 10 to the network 32 be converted by MS 34 of the network 32 to another, selected message type (e.g., a facsimile message, an electronic mail message, or a page message), before being forwarded by the MC 34 to a destination. The manner in which this aspect of the invention is performed will also be described below.

After the performance of the steps indicated by blocks A and A1, the user may modify protocol element information (i.e., specify protocol element state(s)) and/or specify a message type by first operating the mobile terminal 10 (e.g., by depressing one or more predetermined keys of keypad 22) so as to specify that the mobile terminal 10 enter the SMS editor options selection list menu function. By example, the user may specify that the SMS editor options selection list menu function be entered by depressing a key 24b' of keypad 22 located beneath the word "option" appearing on display 20. The mobile terminal 10 then responds by entering the SMS editor options selection list menu function (block B).

Figure 7B:
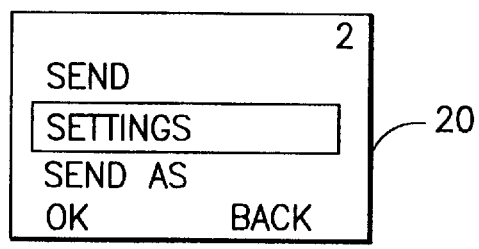

In response to the mobile terminal 10 entering the SMS editor options selection list menu function at block B, the mobile terminal 10 displays a SMS editor options selection list (also referred to as an "options selection list") to the user via display 20, and awaits the depression of one or more keys of keypad 22 by the user specifying that one of the displayed options of the list is selected (block C). The options selection list includes various user-selectable options which, upon selection by the user, enable the user to specify states of various protocol elements so as to place the wireless communication protocol (i.e., IS-136) into a particular configuration, as will be described below. According to a presently preferred embodiment of the invention, the options selection list includes a 'settings' option, a 'send' option, a 'send as' option, an 'archive' option, and a 'clear all' option. These individual options are represented in FIGS. 3a and 3b by blocks D, E, F, G, and H, respectively. Also in accordance with a presently preferred embodiment of the invention, in addition to presenting the options selection list on the display 20, the mobile terminal 10 presents an option for returning to the SMS origination/editor menu function of block A. This option is indicated in FIG. 3b by block I. An example of a portion of the options selection list presented on display 20 of the mobile terminal 10 is shown in FIG. 7b. In FIG. 7b, the option for returning to the SMS origination/editor menu function is represented by the word "Back".

Figure 7C:
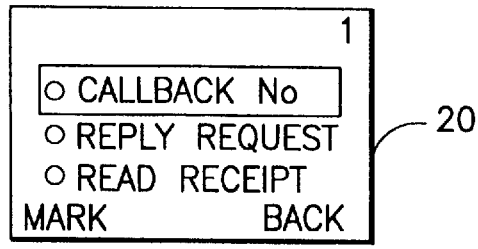
Figure 7D:
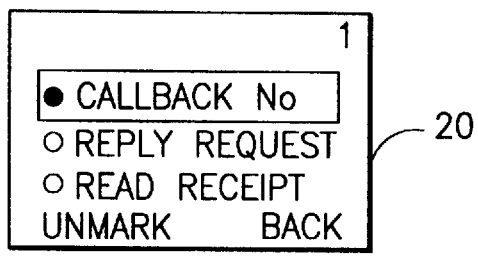

Assuming that in response to the mobile terminal 10 displaying the SMS editor options selection list at block C, the user operates the keypad 22 of the mobile terminal 10 so as to specify that the 'settings' option is selected (block D), then control passes to block D'. At block D' various steps are performed which may be understood in view of blocks D1–D5' of the flow diagram shown in FIG. 4a. At block D1, a sub-menu function is entered where the mobile terminal 10 presents a multi-selection list to the user, via the display 20. The multi-selection list includes various sub-options that may be selected by the user for specifying states of various protocol elements. In accordance with a presently preferred embodiment of the invention, the multi-selection list includes a 'call back number' option, a 'reply request' option, an 'urgency' option, a 'read receipt' option. These options are identified in FIGS. 4a and 4b by blocks D2–D5, respectively. In addition to presenting the multi-selection list on the display 20, the mobile terminal 10 presents an option for returning to one of blocks A or B and, if this option is selected, a 'save' option. These options are indicated in FIG. 4b by blocks D6 and D7, respectively. An example of a portion of the multi-selection list, as presented on the display 20 at block D1, is shown in FIG. 7c, wherein the option indicated by block D6 is represented by the word "Back" on display 20.

The 'call back number' option enables the user to specify a state for the call back number protocol element. That is, the 'call back number' option enables the user to update the information stored as variable SCBN so as to specify a desired state (i.e., select a desired state) of the call back number protocol element. More particularly, the 'call back number' option enables the user to update the information stored as variable SCBN so as to specify whether or not the dialing access code (e.g., CB#) for the mobile terminal 10 is to be included as part of the SMS message (e.g., to indicate "yes" or "no"). Preferably, the information stored as variable SCBN is defaulted to indicate that the dialing access code is not to be included as part of the SMS message.

The user may select the 'call back number' option by depressing one or more predetermined keys of keypad 22 ('Y' at block D2), in which case the mobile terminal 10 responds by updating the information stored as variable SCBN in memory portion 24a (block D2'). By example, assuming that prior to the user's selection the information stored as variable SCBN is defaulted to indicate that the dialing access code is not to be included as part of the SMS message, then the mobile terminal 10 responds to the user's selection of the 'call back number' option by updating the information stored as SCBN in memory portion 24a to indicate that the dialing access code (e.g., CB#) for the mobile terminal 10 shall be included as part of the SMS message to be transmitted from the mobile terminal 10.

The user may also elect to select one or more other ones of the options (i.e., one of the options indicated by blocks D3–D7). By example, the user may elect to select the 'reply request' option (block D3) to specify a desired state for the manual acknowledgement request protocol element. That is, this option enables the user to specify whether or not he desires that the SMS message include a message requesting a manual acknowledgement from a recipient (e.g., a user) of the SMS message.

The user may select the 'reply request' option by depressing one or more predetermined keys of keypad 22 ('Y' at block D3), wherein the mobile terminal 10 responds by updating the information stored as the variable MACK in memory portion 24a. For example, assuming that (as was previously described) the information stored as variable MACK is defaulted to indicate that no manual acknowledgement request shall be included in the SMS message, then the mobile terminal 10 responds to the user's selection of the 'reply request' option by updating the information stored as variable MACK in memory portion 24a to indicate that the manual acknowledgement request shall be included in the SMS message (block D3').

As another option, the user may select the 'urgency' option (block D4). This option enables the user to specify a desired state for the urgency protocol element. More particularly, this option enables the user to specify whether the SMS message should be assigned a 'normal' priority status or an 'urgent' priority status. By example, the user may desire that the SMS message be assigned an 'urgent' priority status in cases in which he wishes to receive an immediate reply from a recipient of the message.

In the preferred embodiment of the invention, the information stored as the msg_urgncy variable is defaulted to indicate the 'normal' priority status for the SMS message. The user may select the 'urgency' option by depressing one or more predetermined keys of keypad 22 ('Y' at block D4), wherein the mobile terminal 10 responds by updating the information stored as variable msg_urgncy in memory portion 24a to indicate that the SMS message is assigned an 'urgent' priority status (block D4').

As a further option, the user may select the 'read receipt' option (block D5). This option enables the user to specify a desired state for the delivery acknowledgement request protocol element. More particularly, this option enables the user to specify whether or not the SMS message is to include a request for a delivery acknowledgement that the message was received by a receiving terminal and displayed to a user of the receiving terminal. As was described previously, the information stored as variable DACK is preferably defaulted to specify that the SMS message is not to include such a request.

The user may select the 'read receipt' option by depressing one or more predetermined keys of keypad 22 ('Y' at block D5), wherein the mobile terminal 10 responds by updating the information stored as variable DACK in memory portion 24a to indicate that the delivery acknowledgement request is to be included in the SMS message (block D5').

After the user has selected one or more of the options designated by blocks D2–D5, he may elect to return to one of blocks A or B. This option is indicated in FIG. 4b by block D6, and may be selected by the user depressing one or more predetermined keys of keypad 22. In response to the user selecting the option designated by block D6, the mobile terminal 10 responds by presenting a message on the display 20 prompting the user to select whether or not the user desires that the modifications made by the user at blocks D2, D3, D4, and/or D5 be saved (block D6').

The user may specify that these selections be saved by depressing one or more predetermined keys of keypad 22 ('Y' at block D7). The mobile terminal 10 then responds by loading the information stored in memory portion 24a as variables SCBN, msg_urgncy, MACK, and DACK into the corresponding variables stored within memory portion 24d (i.e., the user's selections are committed to memory portion 24d) (block D7'). Thereafter, control passes back to block B (FIG. 3a) where the mobile terminal 10 re-enters the SMS editor options selection list menu function and then displays the SMS editor options selection list to the user via display 20 (block C), although in accordance with another embodiment of the invention, control instead passes back to block A.

Assuming that the user operates keypad 22 so as to specify that the protocol element information modifications made by the user under the 'settings' option not be saved ('N' at block D7), then the information stored as variables SCBN, msg_urgncy, MACK, and DACK in memory portion 24a is erased from the memory portion 24a at block D8, and control passes back to block A, although in accordance with another embodiment of the invention, control instead passes back to block B.

It should be noted that after the user has selected any of the individual options designated by blocks D2–D5 so as to specify states for one or more protocol elements, and before the option designated by block D6 is selected, it may occur that the user changes his mind and desires to re-specify a state for one or more of the protocol elements. By example, it is assumed that after the user operates the mobile terminal 10 at block D4 to specify that the 'urgent' priority status be assigned to the SMS message, the user decides that the 'normal' priority status should have been assigned to the message. In this case the user may again operate keypad 22 so as to select the option indicated by block D4, in which case the mobile terminal 10 responds by updating the information stored as the variable msg_urgncy to indicate that the selected priority status of the message is 'normal' rather than 'urgent'.

Having described the various options available to the user under the 'settings' option of the multi-selection list displayed at block D1, the remaining options that are available to the user under the SMS origination/editor menu function (of FIG. 3a) will now be described.

As was previously described, one of the options available to the user under the SMS origination/editor menu function includes a 'send' option. A user may elect to select this option for a case in which, by example, the user previously modified information (i.e., specified states) for one or more of the protocol elements and then saved this information under the 'settings' option in the manner described above. The 'send' option enables the user to specify that the SMS message, including at least the text message stored in memory portion 24b and the information stored as the various variables in memory portion 24d, be transmitted from the mobile terminal 10.

Assuming that the mobile terminal 10 is presenting the options selection list on display 20 (block C), then the user may specify that the SMS message be transmitted by first depressing predetermined keys of keypad 22 so as to specify that the 'send' option is selected ('Y' at block E). The mobile terminal 10 then responds by performing a number of steps which are compositely represented in FIG. 3a by block E'. These steps are shown in further detail as steps E1–E7 in FIG. 4e. At block E1, the mobile terminal 10 presents a message on the display 20 prompting the user to specify an access code (e.g., telephone number) for a destination user terminal to which the user desires the SMS message to be sent. Thereafter, the user may enter a selected access code into the controller 18 of the mobile terminal 10 by, for example, depressing selected keys (e.g., numeric keys) of the keypad 20 (block E2). The controller 18 then responds by storing the entered access code in the memory portion 24b.

After the user specifies the access code, the user may also specify that the message be sent from the mobile terminal 10 by depressing predetermined keys of keypad 20 (block E3). In response to the step indicated by block E3, the controller 18 of the mobile terminal 10 retrieves the stored text message and access code from memory portion 24b, and also retrieves the information stored as the variables MACK, DACK, and MSG_urgncy from memory portion 24d (i.e., this information includes the information previously stored as these variables at block D7', assuming that the user selected the 'save' option of the multi-selection list) (block E4). The controller 18 also examines the information stored as variable SCBN to determine whether or not the information specifies that the CB# should be included in the SMS message (block E5). If 'yes' at block E5, then control passes to block E6 where the controller 18 retrieves the CB# from memory portion 24d. Thereafter, the mobile terminal 10 formats the retrieved information in accordance with, by example, section 7.1.2.2 (SMS Submit) of IS-136.1, Revision A (or later revisions thereof), in order to compose a SMS message, and transmits the SMS message to the base station 30, from where the message is subsequently forwarded to a destination device (block E7).

If 'no' at block E5, then the controller 18 does not retrieve the CB#, and the retrieved information (not including the CB#) is formatted and transmitted to the base station 30 as a SMS message in a similar manner as was described above (block E7).

After the performance of the step indicated by block E7 is performed, control then passes back to block A where the text message stored in memory portion 24b is again presented on the display 20 of the mobile terminal 10.

As was previously described, another one of the options available to the user under the SMS origination/editor menu function includes a 'send as' option (FIG. 3a, block F) The user may elect to select this option for a case in which, by example, he desires that a SMS message transmitted from the mobile terminal 10 to the network 32 be converted by the message center 34 of the network 32 to either a facsimile message, an E-mail message, or a page message, before being forwarded to a destination facsimile device, CPU, or pager, respectively. Assuming that the user desires to select the 'send as' option in response to the mobile terminal presenting the options selection list on the display 20 (block C), the user may select the 'send as' option by depressing one or more predetermined keys of keypad 22 ('Y' at block F). Thereafter, control passes to block F', where a number of steps are performed by the mobile terminal 10. These steps are illustrated in detail in FIG. 4c.

As a first step, the mobile terminal 10 presents on the display 20 a list of 'send as type' options (block F1).

Figure 8A:
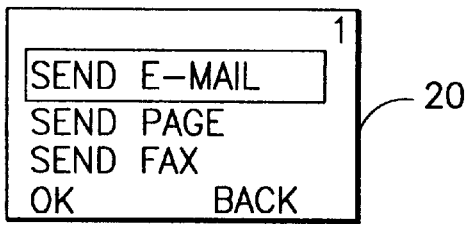
FIGS. 8a–8g show various messages presented on display 20 of the mobile terminal of FIGS. 1a and 2, during portions of the method of FIG. 4c.

According to a preferred embodiment of the invention, this list includes a 'send E-mail' option (block F2), a 'send page' option (block F3), and a 'send facsimile (fax)' option (block F4). Also, the mobile terminal 10 presents on the display 20 an option for returning to the SMS origination/editor menu function (block F5). An example of these options displayed by the mobile terminal 10 on the display 20 at block F1 is shown in FIG. 8a, wherein the option of block 5 is represented as "Back".

Figure 8E:
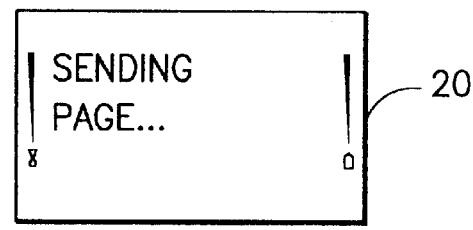
Figure 8B:
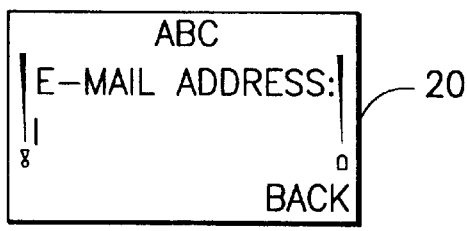

For a case in which the user desires that the SMS message be converted by MC 34 to an E-mail message, the user may specify that the message be converted to an E-mail message by depressing one or more predetermined keys of keypad 22 so as to select the 'send E-mail' option at block F2. In response to the user selecting the 'send E-mail' option at block F2 ('Y' at block F2), the mobile terminal responds by presenting a message on the display 20 to prompt the user for entering a selected E-mail address into the mobile terminal 10, and by the controller 18 monitoring the output of keypad 22 for a user-specified E-mail address (block F2-a). An example of a message presented on the display 20 at block F2-a is shown in FIG. 8b.

Figure 8F:
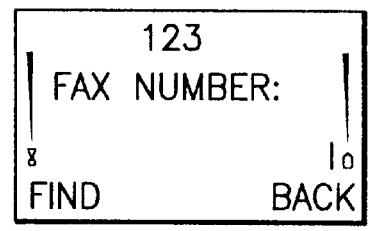
Figure 8C:
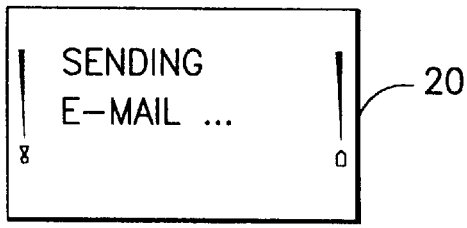

The user may enter an E-mail address into controller 18 of the mobile terminal 10 by depressing selected keys of keypad 22 (if the user desires, this step may be performed in accordance with the "fetch service" operation to be described below). In response to the user entering the E-mail address into the controller 18, the controller 18 stores the entered address in the memory portion 24b. Thereafter, the user may operate keypad 22 of the mobile terminal 10 so as to specify that the SMS message be transmitted to the network 32 (block F2-b). The controller 18 of the mobile terminal 10 then responds by retrieving the stored text message and E-mail address from memory portion 24b, retrieving the information stored as the variables MACK, DACK, and MSG_urgncy from memory portion 24d (block F2-c), and by examining the information stored as variable SCBN to determine whether or not the information specifies that the CB# should be included in the SMS message (block F2-d). If 'yes' at block F2-d, then control passes to block F2-e. At block F2-e the controller 18 retrieves the CB# from memory portion 24d and, thereafter at block F2-f, formats the all of the retrieved information in accordance with, by example, section 7.1.2.2 (SMS Submit) of IS-136.1, Revision A (or later revisions thereof), in order to compose a SMS message, and also transmits the SMS message to the base station 30 in a similar manner as was described above. The SMS message includes information specifying that the SMS message be converted to an E-mail message by the MC 34 before being forwarding to the destination CPU device. The mobile terminal 10 also presents a message on the display 20, indicating that the SMS message has been sent. An exemplary message presented on the display 20 by the mobile terminal 10 is shown in FIG. 8c.

If 'no' at block F2-d, then the step indicated by the block F2-f is performed in a similar manner as described above, except that the CB# is not retrieved or formatted, and the transmitted SMS message does not include the CB#.

After the step identified by block F2-f is performed, control preferably passes back to block A, where the method continues in the above-described manner (e.g., the text message is again presented on the display 20). In another embodiment of the invention, after block F2-f, control passes back to block F1 where the mobile terminal 10 again presents the list of 'send as type' options on display 20.

Figure 8G:
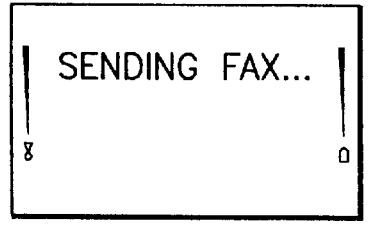
Figure 8D:
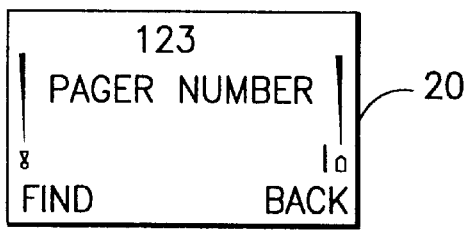

For a case in which the user desires that the SMS message be converted to a page message by the MC 34, the user can specify that the message be converted to a page message by depressing one or more predetermined keys of keypad 22 so as to select the 'send page' option at block F3. In response to the user selecting the 'send page' option at block F3 ('Y' at block F3), the mobile terminal responds by presenting a message on the display 20 to prompt the user for entering a selected pager number, and by the controller 18 monitoring the output of keypad 22 for a user-specified pager number (block F3-a) An example of a message presented on the display 20 at block F3-a is shown in FIG. 8d.

The user may enter a selected pager number into controller 18 of the mobile terminal 10 by depressing selected keys (e.g., numeric keys) of the keypad 22 (if the user desires, this step may be performed in accordance with the "fetch service" operation to be described below). In response to the user entering the pager number into the controller 18, the controller 18 stores the entered number in the memory portion 24b. Thereafter, the user may operate keypad 22 of the mobile terminal 10 so as to specify that the SMS message be transmitted to the network 32a (block F3-b). The controller 18 of the mobile terminal 10 then responds by retrieving the stored text message and pager number from memory portion 24b, retrieving the information stored as the variables MACK, DACK, and MSG_urgncy from memory portion 24d (block F3-c), and by examining the information stored as variable SCBN to determine whether or not the information specifies that the CB# should be included in the SMS message (block F3-d). If 'yes' at block F3-d, then the controller 18 retrieves the CB# from memory portion 24d (block F3-e). Control then passes to block F3-f where the mobile terminal 10 formats the retrieved information (including the retrieved text message, the information retrieved from memory portion 24d, and information specifying that the SMS message be converted to a pager message by MC 34) in accordance with, by example, section 7.1.2.2 (SMS Submit) of IS-136.1, Revision A (or later revisions thereof), in order to compose the SMS message. The mobile terminal 10 then transmits the SMS message to the base station 30 in a similar manner as was described above. The mobile terminal 10 also presents a message on the display 20, indicating that the SMS message has been sent. An exemplary message presented on the display 20 by the mobile terminal 10 is shown in FIG. 8e.

If 'no' at block F3-d, then the step indicated by the block F3-f is performed in a similar manner as described above, except that the CB# is not retrieved or formatted, and the transmitted SMS message does not include the CB#.

After the step identified by block F3-f is performed, control preferably passes back to block A, where the method continues in the above-described manner (e.g., the text message is again presented on the display 20). In another embodiment of the invention, after block F3-f is performed, control passes back to block F1 where the mobile terminal 10 again presents the list of 'send as type' options on display 20.

For a case in which the user desires that the SMS message be converted to a facsimile message, the user can specify that the message be converted to a facsimile message by depressing one or more predetermined keys of keypad 22 to select the 'send fax' option at block F4. In response to the user selecting the 'send fax' option at block F4 ('Y' at block F4), the mobile terminal responds by presenting a message on the display 20 to prompt the user for entering a selected facsimile number for a destination facsimile device into the mobile terminal 10, and by the controller 18 monitoring the output of keypad 22 for a user-specified facsimile number (block F4-a). An example of a message presented on the display 20 at block F4-a is shown in FIG. 8f.

The user may enter a selected facsimile number into controller 18 of the mobile terminal 10 by depressing selected keys (e.g., numeric keys) of the keypad 22 (if the user desires, this step may be performed in accordance with the "fetch service" operation to be described below). In response to the user entering the facsimile number into the controller 18, the controller 18 stores the entered number in the memory portion 24*b*. Thereafter, the user may operate keypad 22 of the mobile terminal 10 so as to specify that the SMS message be transmitted from the mobile terminal 10 to the network 32 (block F4-*b*).

The controller 18 of the mobile terminal 10 then responds by retrieving the stored text message and facsimile number from memory portion 24*b*, retrieving the information stored as the variables MACK, DACK, and MSG_urgncy from memory portion 24*d* (block F4-*c*), and by examining the information stored as variable SCBN to determine whether or not the information specifies that the CB# should be included in the SMS message (block F4-d). If 'yes' at block F4-*d*, then at block F4-*e* the controller 18 retrieves the CB# from memory portion 24*d*. Control then passes to block F4-*f*. At block F4-*f* the mobile terminal 10 formats the retrieved information in accordance with, by example, section 7.1.2.2 (SMS Submit) of IS-136.1, Revision A (or later revisions thereof), in order to compose a SMS message, and transmits the SMS message to the base station 30 in a similar manner as was described above. The transmitted SMS message includes the retrieved text message and CB#, the information retrieved information from variables MACK, DACK, and msg_urgncy, and also information specifying that the SMS message be converted to a facsimile message by MC 34). The mobile terminal 10 also presents a message on the display 20, indicating that the SMS message has been sent. An exemplary message presented on the display 20 by the mobile terminal 10 is shown in FIG. 8*g*.

If 'no' at block F4-*d*, then the step indicated by the block F4-*f* is performed in a similar manner as described above, except that the CB# is not retrieved or formatted, and the transmitted SMS message does not include the CB#.

After the step identified by block F4-*f* is performed, then control preferably passes back to block A, where the method continues in the above described manner (e.g., the text message is again presented on the display 20). In another embodiment of the invention, after block F4-*f* is performed, control passes back to block F1 where the mobile terminal 10 again presents the list of 'send as type' options on display 20.

As was previously described, it should be noted that in accordance with one embodiment of the invention, the E-mail address, pager number, and/or facsimile number entered by the user at blocks F2-*b*, F3-*b*, and F4-*b*, respectively, may be one selected (or "fetched") from the list of addresses and numbers stored in the memory portion 24*c*. By example, in response to the mobile terminal 10 prompting the user for entering the pager number at block F3-*a*, the user may activate the fetch service by depressing one or more predetermined keys of keypad 22. This step is illustrated as block F-*a* in FIG. 4*d*. Thereafter, at block F-*b* of FIG. 4*d* the mobile terminal 10 responds by prompting the user to select one of the pager numbers stored in the memory portion 24*c*, and awaits the depression of one or more keys of keypad 22 by the user for selecting a desired one of the pager numbers. Preferably the step of prompting the user includes a step of displaying at least one of the numbers on the display 20, and the mobile terminal enables the user to either scroll through the stored numbers or perform a "search" (i.e., a "fast search" or "jump") for a selected one of these numbers, and then select a desired one of these numbers by operation of the keypad 22 (block F-*c*). In response to the user selecting a pager number at block F-*c*, then control passes back to block F3-*b* of FIG. 4*c* where the selected number is stored in memory portion 24*b* and the method continues in the manner described above. A similar procedure would be performed in response to the mobile terminal 10 prompting the user to enter a facsimile number at block F4-*a* of FIG. 4*c*, except that (1) the numbers displayed by the mobile terminal 10 at block F-*b* (FIG. 4*d*) include facsimile numbers from the list of facsimile numbers stored in memory portion 24*c*, (2) the user selects one of these numbers at block F-*c*, and (3) after the step indicated by block F-*c* is performed, control passes back to block F4-*b* where the method continues in the manner described above. A similar procedure would also be performed in response to the mobile terminal 10 prompting the user to enter an E-mail address at block F2-*a* of FIG. 4*c*, except that (1) at block F-*b* (FIG. 4*d*) the mobile terminal 10 displays E-mail addresses from the list of E-mail address stored in memory portion 24*c*, (2) the user selects one of these addresses at block F-*c*, and (3) after the step indicated by block F-*c* is performed, control passes back to block F2-*b* where the method continues in the manner described above.

As was previously described, another option that is available to the user while the mobile terminal 10 is displaying the list of 'send as' options at block F1 (FIG. 4*c*) includes an option (block F5) for returning to the SMS origination/editor menu function of block A. The user may select this option at any time while the list of 'send as' options is displayed at block F1. By example, the user may elect to return to the SMS origination/editor menu function after having selected one or more of the 'send E-mail', 'send page', and 'send fax' options at respective blocks F2, F3, and F4, or without having selected any one of these options. The user may select the option for returning to the SMS origination/editor menu function by depressing one or more predetermined keys of keypad 22 (block F6), in which case the mobile terminal 10 responds by returning control back to block A where the SMS origination/editor menu function is re-entered.

Referring again to FIGS. 3*b*, and as was previously described, another one of the options available to the user under the SMS editor options selection list includes an 'archive' option (block G). A user may elect to select this option for a case in which, by example, the user simply desires to have the text message stored (i.e., "archived") in the memory portion 24*b* committed to memory portion 24*d* for later retrieval and potential transmission. The user may specify that the 'archive' option be selected by depressing one or more predetermined keys of keypad 22 ('Y' at block G). The mobile terminal 10 then responds by loading the text message from memory portion 24*b* into memory portion 24*d*, if there is sufficient memory space available in memory portion 24*d* (block G'). Thereafter, the mobile terminal 10 presents a message on the display 20 confirming that the message has been archived or, if is determined that there is insufficient memory space available in memory portion 24*d*, presents a message on the display 20 indicating that there is insufficient memory space available in memory portion 24*d* (block G"). Control is then passed back to block A. It should be noted that it is also within the scope of this invention that states (i.e., including user-specifies states) of protocol elements associated with the text message (if any protocol element states are associated with the text message) may also be stored in accordance with the 'archive' option.

As was previously described, another option available to the user under the SMS editor options selection list includes a 'clear all' option (block H, FIG. 3b). A user may elect to select this option for a case in which, by example, he desires to delete the text message from memory portion 24b. By example, it is assumed that the SMS editor options selection list is displayed on the display 20 (block C). The user may then specify that the text message be deleted from memory portion 24b by depressing one or more predetermined keys of keypad 22 ('Y' at block H). Thereafter, the mobile terminal 10 responds by deleting the text message from the memory portion 24b (block H'). Control then passes back to block A1, where no user-generated text message appears on the display 20, and the mobile terminal 10 waits for the user to enter another text message.

A further option that is available to the user while the mobile terminal 10 is displaying the SMS editor options selection list at block C includes an option (block I) for returning to the SMS origination/editor menu function (block A) (where the user-generated text message previously stored in memory portion 24b at block A1 is again displayed). The user may elect to return to the SMS origination/editor menu function at any time while the SMS editor options selection list is being displayed at block C. By example, the user may elect to return to the SMS origination/editor menu function after having selected one or more of the other options under the SMS editor options selection list of FIGS. 3a and 3b, or without having selected any one of these other options. The user may specify that SMS origination/editor menu function be returned to by depressing one or more predetermined keys of keypad 22 ('Y' at block I), in which case the mobile terminal 10 responds by returning to the SMS origination/editor menu function of block A.

A further aspect of the invention will now be described. In accordance with this aspect of the invention, there are various protocol variables stored in the memory 24. By example, there are 1) multiple sets of protocol variables (hereinafter referred to as "SET1 . . . SETn") and 2) at least one group of other, "common" protocol variables stored in memory 24. Each of the sets of variables includes a plurality of variables that store information (e.g., values) relating to various types of protocol elements. For each set, the information stored as the variables may be user-specified, as will be described below. Also, and as will be further described below, the user may select any one of the sets of variables to be included in a SMS message transmitted from the mobile terminal 10. In this manner, the communication protocol is placed into a particular configuration based on the selected set of variables, and the SMS message is transmitted from the mobile terminal 10 using this configuration of the communication protocol, as will be described below.

Furthermore, each variable of the group of "common" protocol variables stores information defining states of various types of other protocol elements. The information stored as these variables may be accessed by the user to modify the states of the respective protocol elements and thereby place the communication protocol into a particular configuration. The information may then included in a SMS message transmitted from the mobile terminal 10, as will be further described below.

FIGS. 1C shows a preferred embodiment of the memory 24 of the mobile terminal 10 in accordance with this aspect of the invention. The memory 24 of FIG. 1c includes memory portions 24a', 24b', and 24c'. Each of the memory portions 24a', 24b', and 24c' is preferably a non-volatile memory.

Memory portion 24b' functions as a buffer for storing various types of information. By example, memory portion 24b' stores user-generated text messages (or text messages that were previously received by mobile terminal 10 and subsequently retrieved from another portion of memory 24 by the user). Memory portion 24b' also stores access code information (i.e., phone numbers, facsimile numbers, pager numbers, etc.) entered into the mobile terminal 10 by the user.

Memory portion 24a' may be embodied as SIM card 24a" which, as previously described, may be inserted into slot 28 of the mobile terminal 10. The card 24a" is removable from the slot 28, and may be inserted into other terminals that are adapted for receiving the card 24a" (and vice versa). The contents of the memory portion 24a' may then be retrieved using these terminals. According to another embodiment of the invention, memory portion 24a' is an integral component of the mobile terminal 10.

Memory portion 24a' stores the multiple sets of variables SET1 . . . SETn. As was previously described, in accordance with the invention, each of the respective sets SET1 . . . SETn includes a respective plurality of variables. According to a presently preferred embodiment of the invention, these variables include a variable "MSG_MC", a variable "MSG_type", a variable "MSG_validity", a variable "MSG_dest", and a variable "alpha_Id". Various types of information is stored as these respective variables. By example, information defining a message center code and relating to a message center number protocol element (which enables an access code for message center 34 to be specified) is stored as variable "MSG_MC". Information relating to a message conversion type protocol element, which enables the user to select an eventual message type for a SMS message transmitted from mobile terminal 10, is stored as variable "MSG_type". This information specifies whether a message transmitted from the mobile terminal 10 is to be forwarded by the MC 34 to a destination as a SMS message, a facsimile message, an E-mail message, or a page message. Also, information relating to a validity period protocol element is stored as variable "MSG_validity". This information may have a format in accordance with, and the validity period protocol element may be similar to, by example, section 7.1.3(Validity Period) of IS-136.1, Revision A (or later revisions thereof). The information stored as the MSG_validity variable specifies a validity period for a SMS message transmitted from the mobile terminal 10, and may be selected by the user (in a manner as will be described below) from a plurality of predefined time periods that are stored as constants VP1–VPn in memory portion 24a', as will be described below.

Information relating to a destination address protocol element is stored as variable "MSG_dest". The destination address protocol element enables the user to specify a destination address for a SMS message originating from the mobile terminal 10, and the information stored as variable MSG_dest specifies the destination address for the SMS message, as will be described below. Also, information defining an identifier tag for a respective set of variables and relating to an identifier tag protocol element is stored as variable "alpha_Id". The identifier tag protocol element enables the user to specify identifier tags (e.g., identifier messages) for the respective sets of variables SET1 . . . SETn. For the respective sets of variables SET1 . . . SETn, the information stored as variable alpha_Id is preferably defaulted so as to specify a predefined identifier tag for the respective sets of variables, such as, by example, "Set 1", "Set2", "Set3", "Set N", respectively.

Furthermore, memory portion 24a' stores SMS messages received by the mobile terminal 10 from the network 32.

Memory portion 24c' stores a plurality of predefined pager numbers, facsimile numbers, and message center codes (i.e., a directory of pager numbers, facsimile numbers, and message center codes) that may be accessed and selected by the user while the mobile terminal 10 is operating in accordance with the "fetch" service technique (described above).

Memory portion 24c' also stores the common protocol variables. In accordance with a preferred embodiment of the invention, there are two of these variables, namely a "delivery_reports" variable and a "reply_request" variable. The information stored as these variables is hereinafter referred to collectively as "common information", and will be further described below.

A method in accordance with this aspect of the invention will now be described, with reference to FIGS. 5a–6b. The method will be described in the context of a GSM protocol embodiment that provides a Short Message Service (SMS) capability, although the teaching of this invention is not limited for use only with this particular protocol.

At block AA1 (FIG. 5a) it is assumed that the user enters the SMS origination/editor menu function, and thereafter enters a text message into the mobile terminal 10 in a similar manner as was described above. It should be noted however, that, as was previously described, the text message may not be user-generated, but could instead, by example, have been previously received from the air interface and stored in memory portion 24a', in which case it is assumed that the message is retrieved by the user at block AA1 and loaded into memory portion 24b'.

Figure 5A:
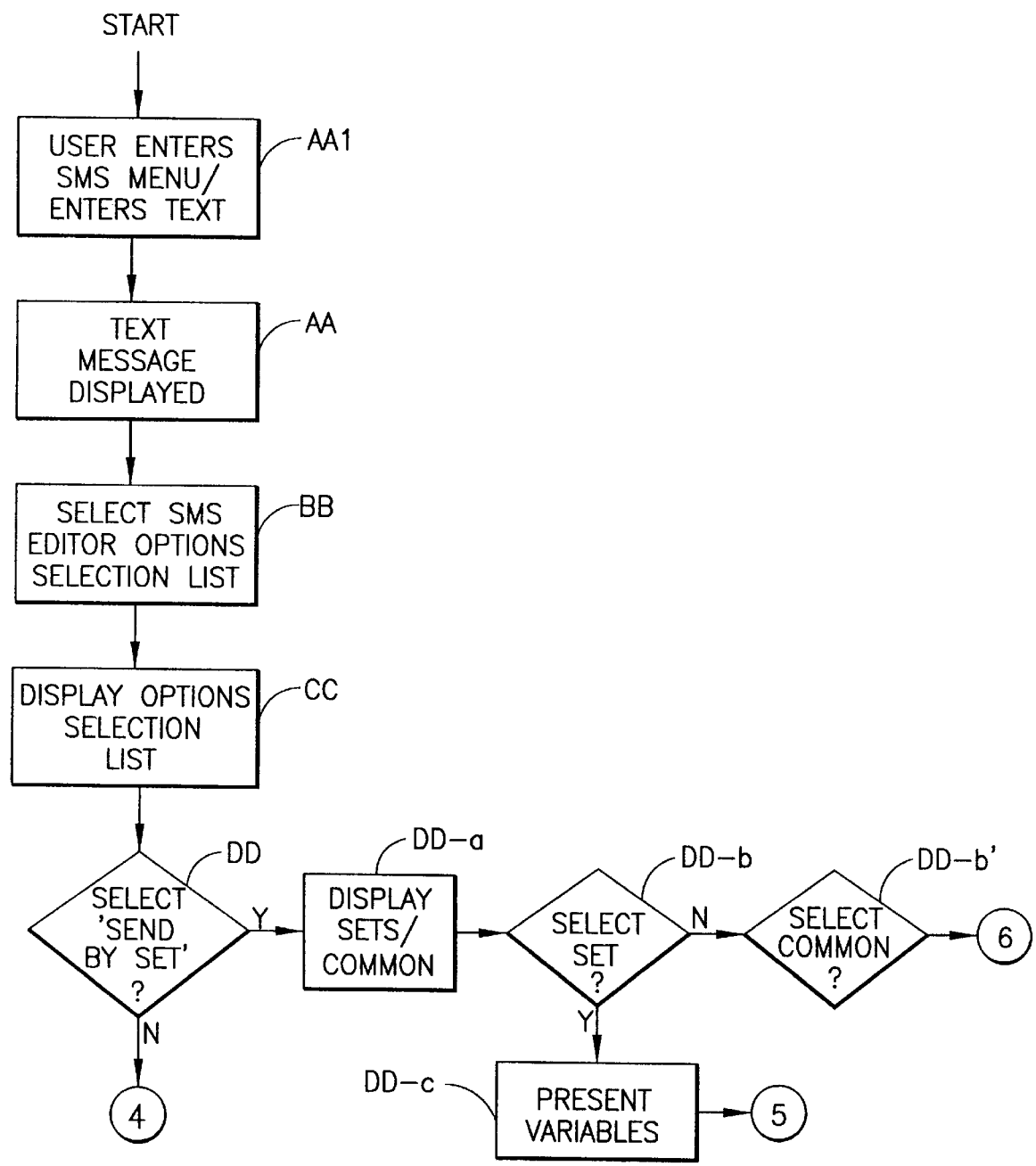
FIGS. 5a–6c show a logic flow diagram of a method executed by the mobile terminal of FIGS. 1a and 2, in accordance with another embodiment of the invention.
Figure 5B:
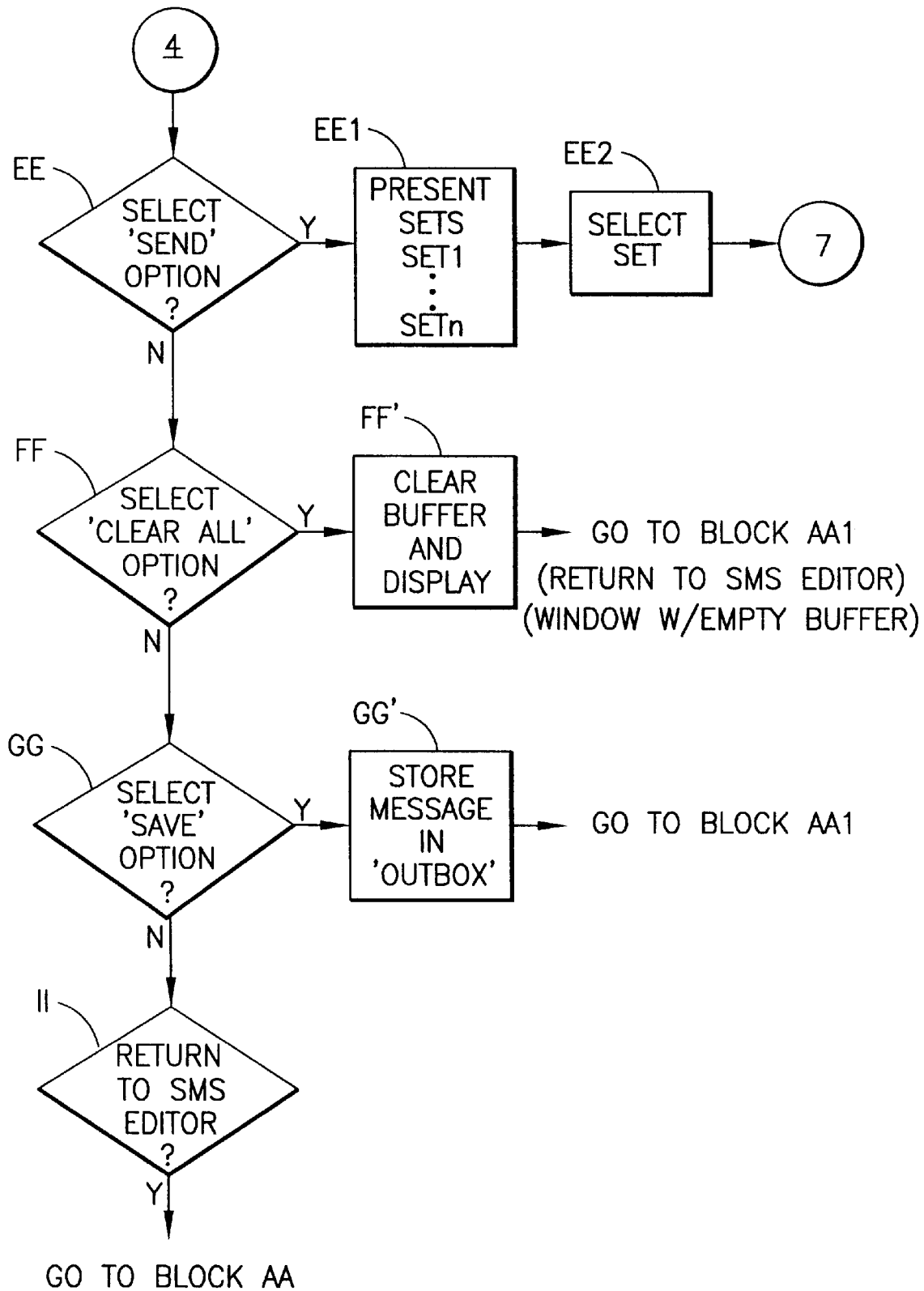

The mobile terminal 10 then responds by presenting the text message on the display 20 (block AA). Then, it is assumed that the user operates the keypad 22 so as to cause the mobile terminal 10 to enter a SMS editor multi-options selection list menu function (block BB). Upon entering the SMS editor multi-options selection list menu function, the mobile terminal presents a list of various, user-selectable options (also referred to as a "multi-options selection list") on the display 20 (block CC). In accordance with the preferred embodiment of the invention, this list includes a 'send by set' option, a 'send' option, a 'clear all' option, and a 'save' option. These options are represented in FIGS. 5a and 5b by blocks DD, EE, FF, and GG, respectively. According to a presently preferred embodiment of the invention, in addition to presenting the options selection list on the display 20, the mobile terminal 10 presents an option for returning to block AA where the SMS origination/editor menu function is re-entered and the text message is displayed on display 20. This option is indicated in FIG. 5b by block I.

Assuming that the user operates the keypad 22 so as to cause the 'send by set' option to be selected ('Y' at block DD), then the mobile terminal 10 responds by entering a menu function which prompts the user to select either 1) one of the sets SET1 . . . SETn of protocol variables or 2) the common settings option. By example, the mobile terminal 10 may prompt the user by displaying the information specified by the alpha_ID of each set SET1 . . . SETn as well as the word "common" on display 20 (block DD-a).

In response to being prompted by the mobile terminal 10 for selecting one of the sets SET1 . . . SETn or the common settings option, the user may select one of the sets SET1 . . . SETn or the common settings option by depressing one or more predetermined keys of the keypad 22 (e.g., so as to scroll through the displayed sets SET1 . . . SETn and the common settings option, and make a desired selection).

Figures 2, 6A:
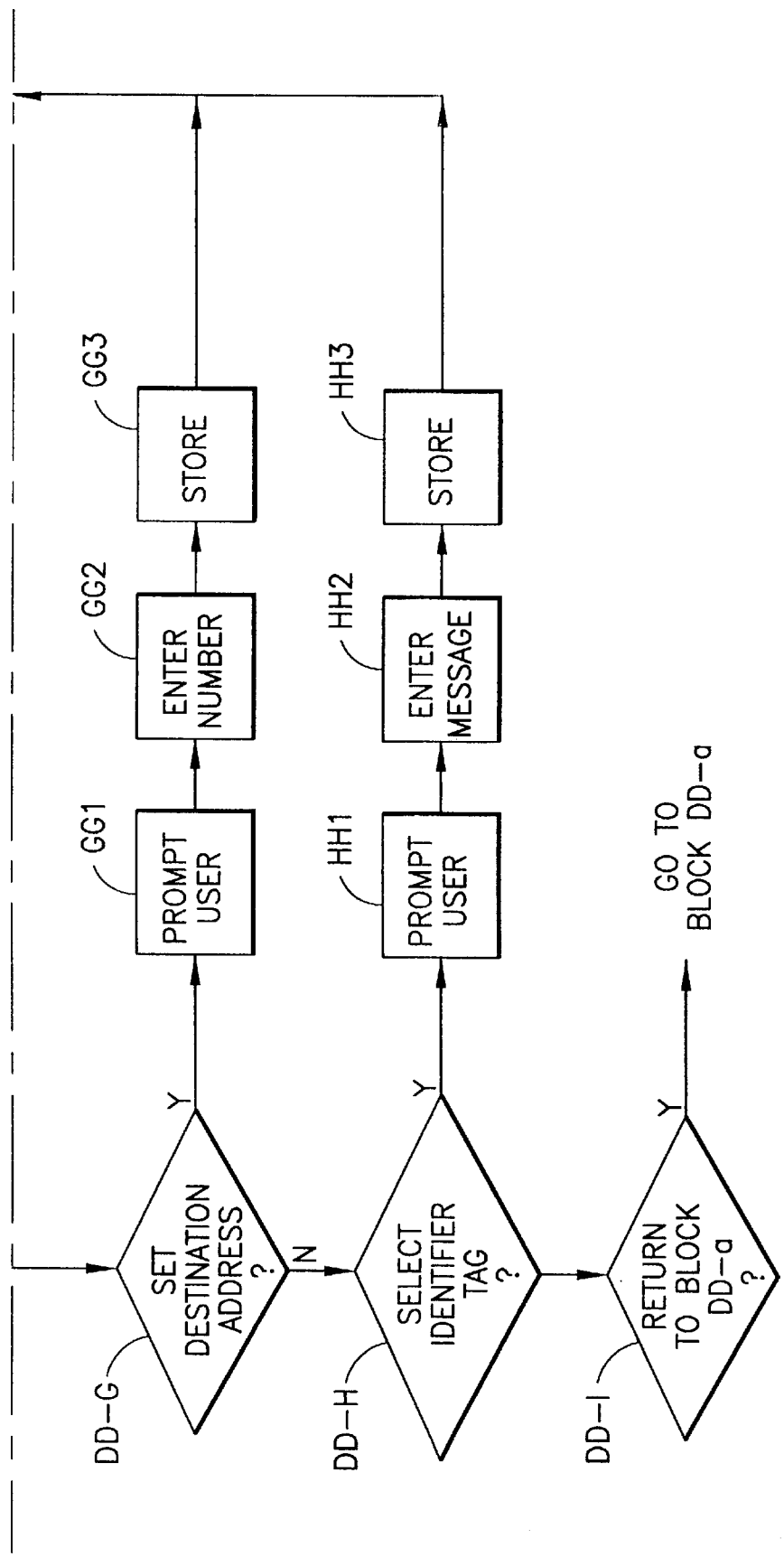
Figure 6B:
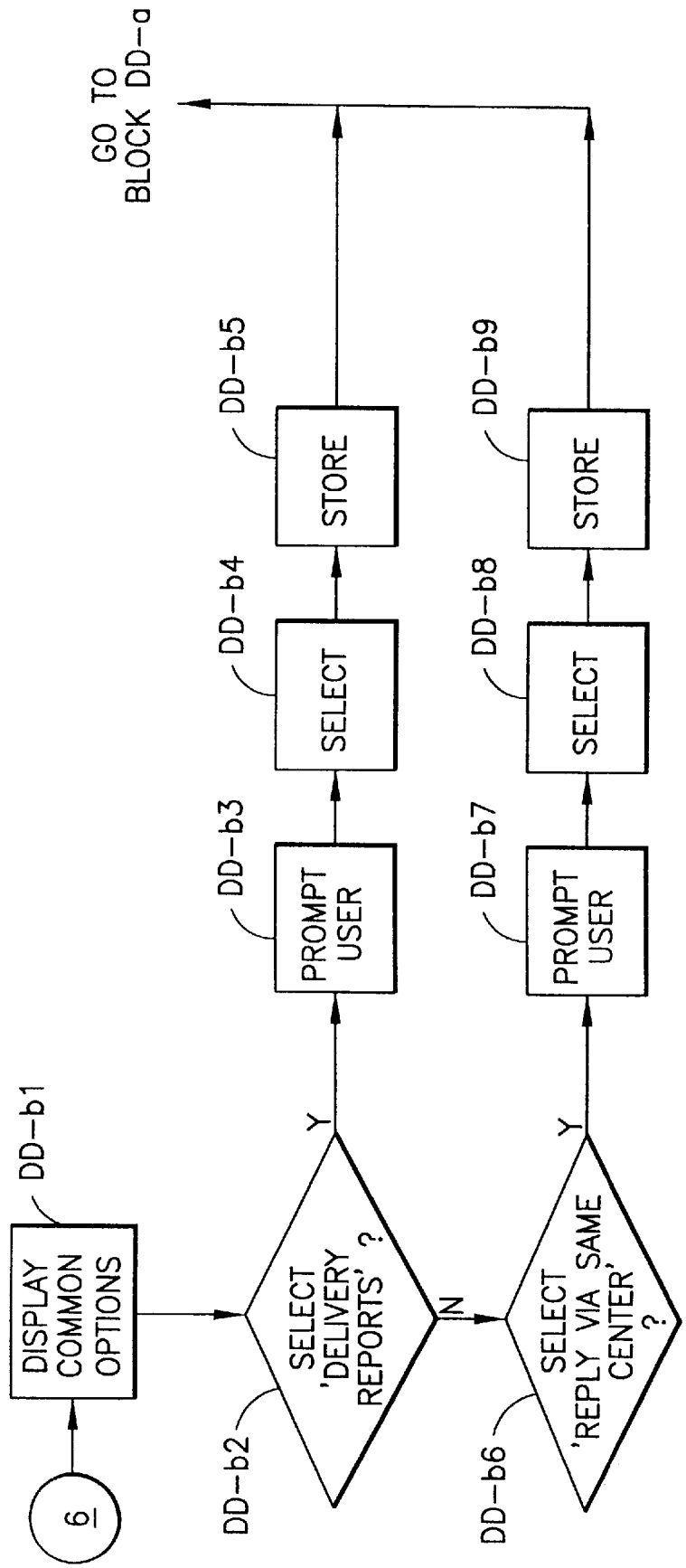
Figure 6C:
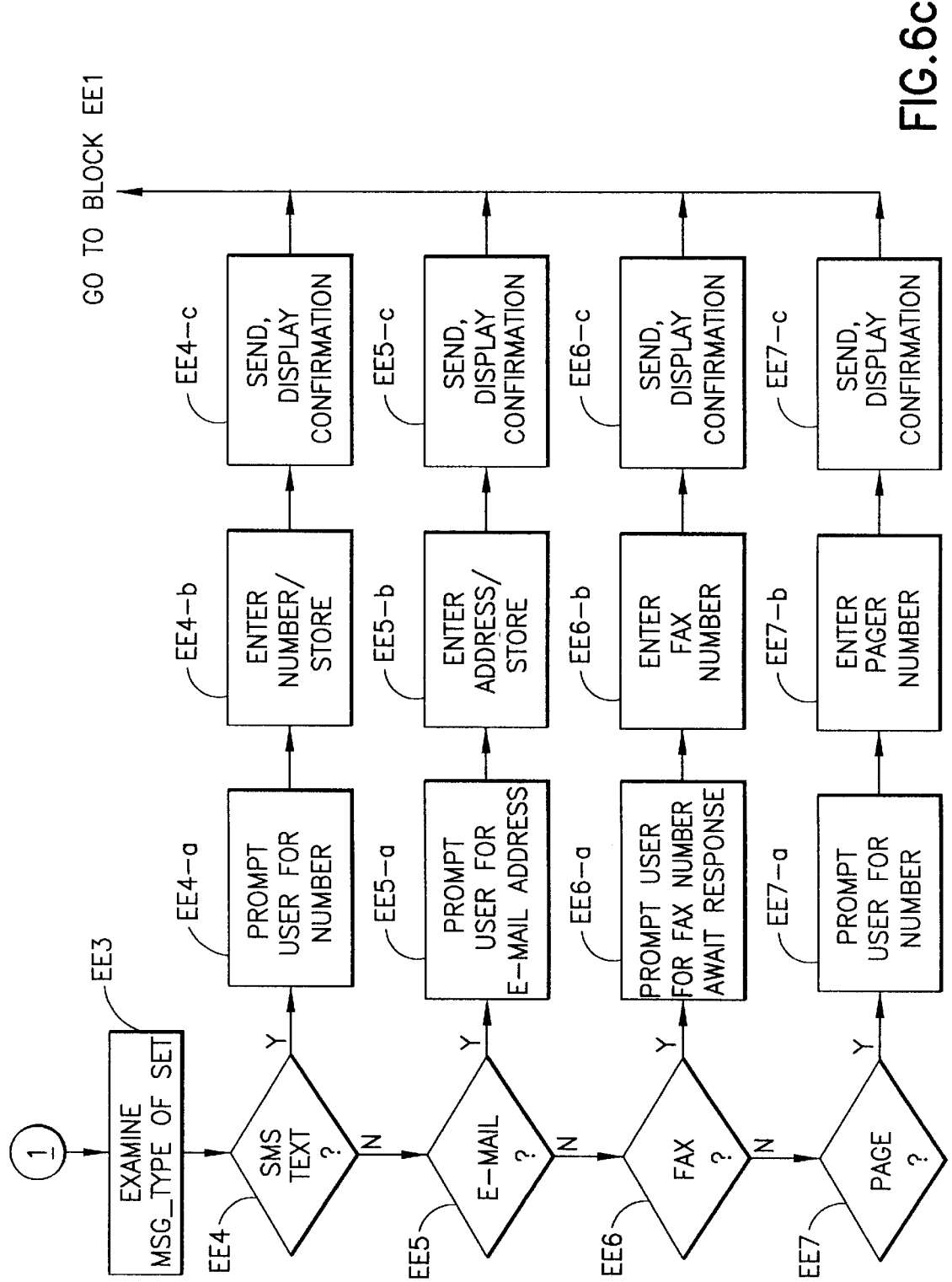

Assuming that the user has selected on the of sets SET1 . . . SETn ('Y' at block DD-b) by operation of the keypad 22, then the mobile terminal 10 responds by prompting the user to select one of a plurality of protocol element modification options associated with the selected set (block DD-c). Preferably, the mobile terminal 10 prompts the user at block c by presenting on the display 20 a list of protocol element modification options that includes a 'message center code' option, a 'message sent as type' option, a 'message validity' option, a 'destination address' option, and an 'alpha identifier' option. These options are represented in FIG. 6a by blocks DD-d, DD-e, DD-f, DD-g, and DD-h, respectively. According to a presently preferred embodiment of the invention, in addition to presenting the list of protocol element modification options on the display 20, the mobile terminal 10 presents on the display 20 an option (indicated by block DD-I) for returning to the menu function of block DD-a (where, as was previously described, the user is prompted to select one of the sets SET1 . . . SETn or the common settings option).

The 'message center code' option (block DD-d, FIG. 6a) enables the user to specify an access code for a message center (e.g., MC 34 or 34') to which a SMS message is to be forwarded. The user may select the 'message center code' option by depressing one or more predetermined keys of keypad 22. Assuming that the user operates the keypad 22 so as to select the 'message center code' option ('Y' at block DD-d), then control passes to block DD1 where the mobile terminal 10 examines the information stored as variable MSG_MC of the selected set SET1 . . . SETn (i.e., the variable MSG_MC of the set SET1 . . . SETn selected previously at block DD-b) to determine whether or not the information specifies a message center code (rather than, by example, '0'). If 'Yes' at block DD1 then the mobile terminal 10 presents the code on the display 20 (block DD1'), and monitors the output of keypad 22 for user-input information for editting the displayed code. By example, the information stored as variable MSG_MC may specify the number "888-8888" (although other, non-numeric codes may be employed if necessary), in which case the mobile terminal 10 displays "center number: 888-8888" at block DD1'. Thereafter, at block DD1" the user may depress one or more appropriate keys of keypad 22, if desired, so as to edit the displayed code, and may then depress one or more other, predetermined keys of keypad 22 to indicate that the editted code be saved in the memory portion 24a'. Alternatively, the user may elect to not edit the displayed code, and may simply operate the keypad 22 so as to indicate that the non-editted, displayed code be saved in the memory portion 24a'. For either case, the mobile terminal 10 responds by saving the code in memory portion 24a' as variable MSG_MC of the selected set SET1 . . . SETn (block DD4), and control then returns to block DD-c.

In 'No' at block DD1, then control passes to block DD2 where the mobile terminal 10 prompts the user to enter a selected message center code into the mobile terminal 10. By example, the mobile terminal 10 may prompt the user for entering the message center code by presenting a message (on display 20) such as "center number:". The user may then enter a desired message center code into the terminal 10 by depressing selected keys (e.g., numeric keys) of the keypad 22 so as to specify the desired message center code (block DD3). The mobile terminal 10 then responds at block DD4 by storing the entered message center code in memory portion 24a' as variable MSG_MC of the selected set SET1 . . . SETn. Control then returns to block DD-c where the protocol element modification options for the selected set SET1 . . . SETn are again presented on display 20.

It should be noted that in accordance with one embodiment of the invention, the message center code entered by the user at block DD2 may be one selected (or "fetched")

from the directory of numbers stored in the memory portion 24c'. By example, for this case, in response to the mobile terminal 10 prompting the user for entering the message center code at block DD2, the steps F-a, F-b, and F-c of the flow diagram of FIG. 4d may be performed in a similar manner as was described above, except that (1) at block F-b the mobile terminal 10 prompts the user to select one of the message center codes stored in memory portion 24c', (2) at block F-c the user operates the keypad 22 so as to select one of these codes and (3) after block F-c is performed, control is passed back to block DD-3 of FIG. 6a where the selected code is saved by the user and the method continues in the above-described manner.

As another option under the list of protocol element modification options presented on display 20 at block DD-c, the user may select the 'message sent as type' option (block DD-e, FIG. 6a) (also referred to as a 'message conversion type option'), which enables the user to specify whether or not the MC 34 shall convert a SMS message originating from the mobile terminal 10 to a different message type (e.g., a facsimile message, an E-mail message, or a page message). By example, and as was previously described, the user may elect to select this option when he desires that a SMS message sent to the network 32 be converted by the message center 34 to a facsimile message, an E-mail message, or a page message, before being subsequently forwarded to a destination facsimile device, CPU, or pager, respectively.

The user may select the 'message sent as type' option by depressing one or more predetermined keys of keypad 22 ('Y' at block DD-e). The mobile terminal 10 then responds by prompting the user to specify a particular message type. That is, the mobile terminal 10 prompts the user to select whether he desires that the message be sent to a destination as a SMS message, or whether he desires that the message be converted to a facsimile message, an E-mail message, or a pager message (block EE1) before being provided to the destination. By operation of the keypad 22, the user may select a desired one of these message types (block EE2). Thereafter, at block EE3 the mobile terminal 10 responds by storing information indicating the selected message type as the variable MSG_type of the selected set of variables SET1 . . . SETn (i.e., for the set SET1 . . . SETn previously selected at block DD-b) . Control the passes back to block DD-c.

As another option under the list of protocol element modification options presented on display 20 at block DD-c, the user may select the 'message validity' option (block DD-f, FIG. 6a), which enables the user to specify a time period (e.g., minutes, hours, days, weeks, etc.) during which the MC 34 is to store a SMS message received by the network 32 from mobile terminal 10, before deleting the message if the message cannot be successfully forwarded to a destination within the time period. In accordance with a preferred embodiment of the invention, the constants VP1–VPn stored in memory portion 24a' include information specifying 1 hour, 6 hours, 24 hours, 72 hours, one week, or information specifying that the validity period be determined by the MC 34.

The user may select the 'validity period' option by depressing one or more predetermined keys of keypad 22 ('Y' at block DD-f). The mobile terminal 10 then responds by prompting the user to select a particular one of the predefined validity periods VP1–VPn, and by then monitoring the output of keypad 22 to detect user-input information specifying that a particular one of the validity periods VP1–VPn is selected (block FF1). The mobile terminal 10 may prompt the user by, for example, presenting the information stored as constants VP1–VPn on display 20. By operation of the keypad 22, the user may select a desired one of these validity periods (block FF2). Thereafter, at block FF3 the mobile terminal 10 responds by storing information indicating the selected validity period as the variable MSG_validity of the selected set of variables SET1 . . . SETn (i.e., for the set SET1 . . . SETn previously selected at block DD-b). Control the passes back to block DD-c.

Another option available to the user under the list of protocol element modification options (block DD-c) includes the 'destination address' option. The user may select this option where he desires to specify an access code (i.e., phone number) for a destination terminal to which a SMS message is to be communicated. The user may select the 'destination address' option by depressing one or more predetermined keys of keypad 22, specifying that the 'destination address' option be selected ('Y' at block DD-g). The mobile terminal 10 then responds by presenting a message on the display 20 prompting the user to enter a desired access code for the destination terminal, and by awaiting the depression of one or more keys of keypad 22 for the user's input (block GG1). The user may specify the desired access code by operating selected keys (e.g., numeric keys) of keypad 22 (block GG2), in which case the mobile terminal 10 responds by storing the entered access code in the memory portion 24a' as the variable MSG_dest of the selected set of variables SET1 . . . SETn (i.e., for the set SET1 . . . SETn previously selected at block DD-b). Control then passes back to block DD-c.

If the user desires, he may specify an identifier tag for the selected set SET1 . . . SETn of variables. This may be accomplished by the user operating keypad 22 so as to specify that the 'select identifier tag' option is selected at block DD-h ('Y' at block DD-h). In response, the mobile terminal 10 presents the identifier message stored as variable alpha_tag for the selected set SET1 . . . SETn on display 20, and prompts the user for editting the message, if desired (block HH1). By example, assuming that the identifier message for the selected set SET1 . . . SETn specifies "Set1", then the mobile terminal 10 displays "Set 1" on the display, as well as a blinking cursor appearing at the end of the identifier message. Thereafter, at block HH2 the user may depress one or more selected keys of keypad 22, if desired, so as to edit the displayed identifier message, and may then depress one or more other, predetermined keys of keypad 22 to indicate that the editted identifier message be saved in the memory portion 24a'. By example, the user may edit the identifier message at block HH2 so that it reads "E-mail boss".

After the step identified by block HH2 is performed, the mobile terminal 10 stores the identifier message specified by the user as the variable ID_tag for the selected set of variables SET1 . . . SETn (block HH3). Control then returns to block DD-c.

A further option that is available to the user while the mobile terminal 10 is displaying the list of protocol element modification options at block DD-c includes an option for returning control back to block DD-a, where the menu function is re-entered that prompts the user to select one of the sets SET1 . . . SETn or the common settings option. The user may specify that control return back to block DD-a by depressing one or more predetermined keys of keypad 22 ('Y' at block DD-I), in which case the mobile terminal 10 responds by passing control back to block DD-a, although in accordance with other embodiments of the invention these steps may be performed so as to return control back to either of blocks AA1 or AA.

As was previously described, and referring again to FIG. 5a, one of the options available to the user at the menu function designated by block DD a is the 'common settings' option. Assuming that the user does not elect to select one of the sets of variables SET1 ... SETn ('N' at block DD-b), but instead operates the keypad 22 so as to cause the 'common settings' option to be selected ('Y' at block DD-b'), then control passes through connector 6 to block DD-b1 of FIG. 6b. At block DD-b1 the mobile terminal 10 enters a menu function which prompts the user to select one of a plurality of "common setting options". Preferably, there are two of these options, namely, a 'delivery reports' option (block DD-b2) and a 'reply via same center' option (block DD-b6).

The 'delivery reports' option enables the user to specify a state of a delivery report protocol element. In particular, the 'delivery reports' option enables the user to specify whether or not he desires that the mobile terminal 10 be provided with a delivery report from the network 32 after sending a message to a destination device (e.g., terminal, facsimile device, or pager device) through the network 32. More particularly, the 'delivery reports' option enables the user to specify whether, after a SMS message is sent from the mobile terminal 10 to the network 32, the mobile terminal 10 is to be provided with a report regarding whether or not the message has been eventually successfully delivered to a destination.

The user may select the 'delivery reports' option by depressing one or more predetermined keys of keypad 22 ('Y' at block DD-b2). In response to the selection made by the user at block DD-b2, the mobile terminal 10 prompts the user for selecting either 'yes' (indicating a request that the mobile terminal 10 be provided with a delivery report after sending a message) or 'no' (indicating that no delivery report should be provided) (block DD-b3). At block DD-b4 the user may select either 'yes' or 'no' by depressing respective, predetermined key(s) of keypad 22. The mobile terminal 10 then responds by storing information indicating the user's selection as the variable delivery_reports in memory portion 24c' (block DD-b5). Control then passes back to block DD-a.

The 'reply via same center' option (block DD-b6) will now be described. The 'reply via same center' option enables the user to specify a state of a reply path protocol element. More particularly, the 'reply via same center' option enables the user the specify, by example, whether or not he requests that after a particular SMS message is communicated from the mobile terminal 10 through a particular message center (e.g., MC 34) to a destination terminal, the destination terminal return a reply message through the same message center. The user may select the 'reply via same center' option by depressing one or more predetermined keys of keypad 22 ('Y' at block DD-b6). In response to the selection made by the user at block DD-b6, and in accordance with a presently preferred embodiment of the invention, the mobile terminal 10 prompts the user for selecting either 'yes' (indicating that the user desires that the reply message be provided through the same message center) or 'no' (indicating that the user does not require that a reply message be provided through the same message center) (block DD-b7). At block DD-b8 the user may select either 'yes' or 'no' by depressing respective, predetermined key(s) of keypad 22. Thereafter, the mobile terminal 10 responds by storing information indicating the user's selection as variable reply_request in memory portion 24c'.

Control then passes back to block DD-a. It should be noted that in accordance with other embodiments of the invention there may be additional options available to the user under the list of common options presented at block DD-b1, including, by example, options for returning control back to either of blocks AA1 or AA.

Reference is again made to FIGS. 5a and 5b where the flow diagram for the multi-option selection list is shown. As was previously described, one of the options available to the user under the multi-option selection list includes a 'send' option (block EE of FIG. 5b). This option enables the user to specify that a SMS message be transmitted from the mobile terminal 10. The user may select the 'send' option by depressing predetermined keys of keypad 22. Assuming that the user operates the keypad 22 so as to cause the 'send' option to be selected ('Y' at block EE), then the mobile terminal 10 responds by entering a menu function which prompts the user to select one of the sets of protocol variables stored in memory portion 24a' SET1 ... SETn (block EE1). By example, the mobile terminal 10 may perform this step by presenting the identifier message of the respective sets SET1 ... SETn on the display 20. The user may then select one of these sets SET1 ... SETn by operation of the keypad 22 (block EE2).

After the user makes a selection at block EE2, control passes through connector 7 to block EE3 (FIG. 6c) where the mobile terminal 10 examines the information stored as the variable MSG_type for the selected set SET1 ... SETn in order to determine whether this information indicates that (1) the SMS message is not to be converted into another message type by the MC 34, but should be communicated to a destination terminal as a SMS message, (2) the SMS message should be converted to an E-mail message by MC 34, before being forwarded to a destination CPU device, (3) the SMS message should be converted to a facsimile message by MC 34, before being forwarded to a destination facsimile device, or (4) the SMS message should be converted to a pager message by MC 34, before being forwarded to a destination pager device.

Assuming that at block EE3 the mobile terminal 10 determines that the information stored as variable MSG_type indicates that the message stored in memory portion 24b' be communicated as a SMS message ('Y' at block EE4), then control passes to block EE4-a where the mobile terminal 10 prompts the user for specifying an access code (phone number) for a mobile terminal to which the message is desired to be communicated. At block EE4-b the user may specify the desired access code by depressing selected keys (e.g., numeric keys) of keypad 22. Thereafter, the mobile terminal 10 responds by storing the entered access code in the memory portion 24b. After the user specifies the access code, the user may also specify that the message be sent from the mobile terminal 10 by depressing predetermined keys of keypad 20 (block EE4-c), Thereafter, the mobile terminal 10 retrieves the text message and access code stored in memory portion 24b, the common information from memory portion 24c', and the information stored as the various variables of the set SET1 ... SETn selected previously at block EE2, and formats the retrieved information in accordance with, by example, section 7.1.2.2 (SMS Submit) of IS-136.1, Revision A (or later revisions thereof) to compose a SMS message. The mobile terminal 10 then transmits the SMS message to the base station 30, and also presents on the display 20 a confirmation message indicating that the SMS message has been sent. After the mobile terminal 10 transmits the SMS message to the base station 30, control passes back to block EE1.

Assuming that at block EE3 the mobile terminal 10 determines that the information stored as variable MSG_type indicates that the SMS message be converted to an E-mail message by the MC 34 ('Y' at block EE5), then the steps indicated by blocks EE5-a, EE5-b, and EE5-c are performed. At block EE5-a the mobile terminal 10 prompts the user for specifying an E-mail address for a CPU device to which the message is desired to be communicated. At block EE5-b the user may specify the desired address by depressing selected keys of keypad 22. Thereafter, the mobile terminal 10 responds by storing the entered E-mail address in the memory portion 24b. After the user specifies the E-mail address, the user may also specify that the message be sent from the mobile terminal 10 by depressing predetermined keys of keypad 20. Thereafter, the mobile terminal 10 retrieves the text message and E-mail address from memory portion 24b', the common information from memory portion 24c', as well as the information stored as the various variables of the set SET1 . . . SETn selected previously at block EE2, and formats the retrieved information in accordance with, by example, section 7.1.2.2 (SMS Submit) of IS-136.1, Revision A (or later revisions thereof) to compose a SMS message. The SMS message includes a message specifying that the MC 34 convert the message to an E-mail message before forwarding the message to a destination CPU device corresponding to the user-specified E-mail address. The mobile terminal 10 then transmits the SMS message to the base station 30, and also presents on the display 20 a confirmation message indicating that the SMS message has been sent (block EE5-c). After the mobile terminal 10 transmits the SMS message to the base station 30, control passes back to block EE1.

Assuming that at block EE3 the mobile terminal 10 determines that the information stored as variable MSG_type indicates that the message stored in memory portion 24b' be converted by the MC 34 to a facsimile message by MC 34 ('Y' at block EE6-b), then the steps indicated by blocks EE6-a, EE6-b, and EE6-c are performed in a similar manner as the steps indicated by blocks EE5-a, EE5-b, and EE5-c, respectively, described above. However, at block EE6-a the mobile terminal 10 prompts the user for specifying a facsimile number rather than an E-mail address, and at block EE6-b the user enters a facsimile number into the terminal 10 which stores the facsimile number in memory portion 24b'. Also, after storing the facsimile number, the mobile terminal 10 retrieves the text message and facsimile number from memory portion 24b', the common information from memory portion 24c', as well as the information stored as the various variables of the selected set SET1 . . . SETn (i.e., the set selected previously at block EE2), and formats the retrieved information in accordance with, by example, section 7.1.2.2 (SMS Submit) of IS-136.1, Revision A (or later revisions thereof) to compose a SMS message. The SMS message includes a message specifying that the MC 34 convert the message to a facsimile message before forwarding the message to a destination facsimile device corresponding to the facsimile number. The mobile terminal 10 then transmits the SMS message to the base station 30, and also presents a confirmation message on the display 20 (block EE6-c), in a similar manner as was described above. After the mobile terminal 10 transmits the SMS message to the base station 30, control passes back to block EE1.

Assuming that at block EE3 the mobile terminal 10 determines that the information stored as variable MSG_type indicates that the message stored in memory portion 24b' be converted by the MC 34 to a page message by MC 34 ('Y' at block EE7), then the steps indicated by blocks EE7-a, EE7-b, and EE7-c are performed in a similar manner as the steps indicated by blocks EE5-a, EE5-b, and EE5-c, respectively, described above. However, at block EE7-a the mobile terminal 10 prompts the user for specifying a pager number rather than an E-mail address, and at block EE7-b the user enters a pager number into the terminal 10 which then stores the number in memory portion 24b'. Also, after storing the pager number, the mobile terminal 10 retrieves the text message and pager number from memory portion 24b', the common information from memory portion 24c', and also the information stored as the various variables of the selected set SET1 . . . SETn, and formats this information in accordance with, by example, section 7.1.2.2 (SMS Submit) of IS-136.1, Revision A (or later revisions thereof) to compose a SMS message. The SMS message includes a message specifying that the MC 34 convert the message to a page message before forwarding the message to a destination pager device corresponding to the pager number. The mobile terminal 10 then transmits the SMS message to the base station 30, and also presents a confirmation message on the display 20 (block EE7-c), in a similar manner as was described above. After the mobile terminal 10 transmits the SMS message to the base station 30, control passes back to block EE1.

It should be noted that it is within the scope of this invention that after any one of the steps indicated by blocks EE4-c, EE5-c, EE6-c, and EE7-c is performed, the mobile terminal 10 presents to the user a user-selectable option for returning to either of blocks AA or AA1.

It also should be noted that for the steps indicated by blocks EE6-b and EE7-b, the respective facsimile and pager numbers entered by the user may be selected using the "fetch" service in a similar manner as was described above.

Referring again to FIGS. 5a and 5b, another option available to the user under the multi-option selection list displayed at block CC includes a 'clear all' option (block FF, FIG. 5b). The user may select this option by depressing one or more predetermined keys of keypad 22, in which case the mobile terminal 10 responds by deleting the text message from the memory portion 24b (block FF'). Control then passes back to block AA1 where the SMS origination/editor menu function is entered (with no user-generated message appearing on the display 20), and the mobile terminal 10 waits for the user to enter another text message.

At block GG the user may select the 'save' option. The user may select this option by depressing one or more predetermined keys of keypad 22. For a case where the user selects this option ('Y' at block GG), control passes to block GG' where the controller 18 loads the buffered text message from memory portion 24b' to memory portion 24a for later retrieval by the user. Control then passes to block AA1. In this manner, memory portion 24b' becomes cleared of the text message, enabling the user to enter and/or edit another text message while the mobile terminal 10 operates in the SMS origination/editor menu function at block AA1.

As was previously described, a further option that is available to the user while the mobile terminal 10 is displaying the multi-options selection list at block CC includes an option (block II) for returning to the SMS origination/editor menu function where the text message stored in memory portion 24b' is displayed on display 20 (at block AA). The user may elect to return to this menu function at any time while the multi-options selection list is displayed at block CC. The user may select to return to the SMS origination/editor menu function by depressing one or more predetermined keys of keypad 22 ('Y' at block II), in which case the mobile terminal 10 responds by returning to the SMS origination/editor menu function of block AA.

Although described in the context of a mobile terminal having a keypad for receiving input from a user, it is within the scope of this invention to employ any other suitable type of user input interface. By example, if the mobile terminal is connected to a computer, the user can employ the computer's keyboard for entering information, and user-generated messages can be output from the computer via a cable or an IR link, and can be displayed on the computer's screen. Alternatively, a suitable mobile terminal or computer voice recognition system can be employed by the user to enter the information.

Furthermore, and as was indicated previously, the teaching of this invention is not limited for use with any one particular type of communication protocol (such as the one specified by IS-136).

While the invention has been particularly shown and described with respect to preferred embodiments thereof, it will be understood by those skilled in the art that changes in form and details may be made therein without departing from the scope and spirit of the invention.

What is claimed is:

1. A method for operating a mobile terminal of a type that is bidirectionally coupled through a wireless interface to a network operating in accordance with a wireless communication protocol, the method comprising the steps of:

at the mobile terminal, composing or editing a text message for transmittal to the network through said wireless interface using a Short Message Service of said network, said message including a set of protocol variables;

after composing or editing said text message, changing at least one protocol variable in said included set; and transmitting said text message from the mobile terminal to the network using the changed set of protocol variables.

2. A method for operating a mobile terminal of a type that is bidirectionally coupled through a wireless interface to a network operating in accordance with a wireless communication protocol, the method, as set forth in claim 1, wherein said changed set of protocol variables is indicative of one of an electronic mail message, a facsimile message, a SMS message, and a page message.

3. A method for operating a mobile terminal of a type that is bidirectionally coupled through a wireless interface to a network operating in accordance with a wireless communication protocol, the method, as set forth in claim 1, further including the step of storing a plurality of sets of protocol variables, each of said sets of variables relating to a respective function of said wireless communication protocol; and wherein said step of changing at least one protocol variable is accomplished by selecting from the plurality of stored sets of protocol variables.

4. A method for operating a mobile terminal of a type that is bidirectionally coupled through a wireless interface to a network operating in accordance with a wireless communication protocol, said mobile terminal including a memory and a control processor, the method comprising the steps of:

storing in said memory a plurality of sets of protocol variables, each of said sets of variables relating to a respective function of said wireless communication protocol;

at the mobile terminal, composing or editing a text message for transmittal to the network through said wireless interface using a Short Message Service of said network, said message including a set of protocol variables;

changing said included set of protocol variables by selecting one of the stored sets of variables to place said wireless communication protocol into a selected function; and (e) transmitting said text message from the mobile terminal to the network using the selected function of the wireless communication protocol.

5. A method as set forth in claim 4, wherein said function includes one of an electronic mail message, a facsimile message, a SMS message, and a page message.

6. A radiotelephone, comprising:

a transceiver for bidirectionally coupling said radiotelephone through a wireless interface to a network operating in accordance with a wireless communication protocol;

an input user interface;

an output interface;

a memory for storing a plurality of sets of protocol variables, each of said sets of variables relating to a respective function of said wireless communication protocol;

a control processor coupled to said transceiver, said input interface, said output interface, and to said memory, to operate said radiotelephone in accordance with a stored program for transmitting messages over a short message system of a communications network;

wherein a user can compose or edit a message text and after said composing or editing change an existing set of protocol variables by selecting from said plurality of sets of protocol variables, to change the function of the short message system.

7. A radiotelephone, as described in claim 6, wherein said function includes one of an electronic mail message, a facsimile message, a SMS message, and a page message.

* * * * *